United States Patent
Lee et al.

(10) Patent No.: US 10,666,332 B2
(45) Date of Patent: *May 26, 2020

(54) METHOD AND APPARATUS FOR OPERATING BEAMFORMED REFERENCE SIGNAL IN COMMUNICATION SYSTEM

(71) Applicant: Samsung Electronics Co., Ltd., Suwon-si, Gyeonggi-do (KR)

(72) Inventors: Keon-Kook Lee, Suwon-si (KR); Tae-Young Kim, Seoul (KR); Jee-Hwan Noh, Suwon-si (KR); Hyun-Il Yoo, Suwon-si (KR); Su-Ryong Jeong, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/698,369

(22) Filed: Nov. 27, 2019

(65) Prior Publication Data

US 2020/0099427 A1     Mar. 26, 2020

Related U.S. Application Data

(63) Continuation of application No. 15/989,817, filed on May 25, 2018, now Pat. No. 10,505,604, which is a (Continued)

(51) Int. Cl.
*H04B 7/0456* (2017.01)
*H04L 5/00* (2006.01)

(52) U.S. Cl.
CPC ......... *H04B 7/0486* (2013.01); *H04B 7/0478* (2013.01); *H04L 5/0023* (2013.01); *H04L 5/0051* (2013.01); *H04B 7/0469* (2013.01)

(58) Field of Classification Search
CPC ....... H04L 5/0051; H04L 5/0023; H04L 5/00; H04B 7/0456; H04B 7/0478;
(Continued)

(56) References Cited

U.S. PATENT DOCUMENTS 9,294,172 B2   3/2016   Park et al.
9,985,704 B2   5/2018   Lee et al.
(Continued)

OTHER PUBLICATIONS

R1-153168, 2D Codebook with KP structure and ssociated feedback, 3GPP TSG-RAN WG1#81, May 16, 2015.
(Continued)

*Primary Examiner* — Rahel Guarino
(74) *Attorney, Agent, or Firm* — Jefferson IP Law, LLP

(57) ABSTRACT

The present disclosure relates 5G or pre-5G communication systems for supporting higher data transmission rate than those by LTE or other post-4G communication systems. According to the present disclosure, a method for operating a beamformed reference signal by a base station and terminal in a communication system, and the terminal, are provided. The method includes transmitting, to a terminal, control information indicating whether a first codebook is used for generating feedback information on a downlink reference signal. The first codebook is used if generating feedback information on the beamformed reference signal and is generated based on a number of antenna ports and a number of ranks.

20 Claims, 11 Drawing Sheets

Related U.S. Application Data continuation of application No. 15/235,810, filed on Aug. 12, 2016, now Pat. No. 9,985,704.

(60) Provisional application No. 62/204,582, filed on Aug. 13, 2015, provisional application No. 62/232,016, filed on Sep. 24, 2015, provisional application No. 62/240,744, filed on Oct. 13, 2015, provisional application No. 62/245,630, filed on Oct. 23, 2015.

(58) Field of Classification Search
CPC .. H04B 7/0617; H04B 7/0486; H04B 7/0469; H04W 88/02; H04W 88/08; Y02D 70/1224; Y02D 70/1242; Y02D 70/12; Y02D 70/1264

See application file for complete search history.

(56) References Cited

U.S. PATENT DOCUMENTS

| | | |
|---|---|---|
| 2011/0064159 A1 | 3/2011 | Ko et al. |
| 2013/0242773 A1 | 9/2013 | Wernersson et al. |
| 2014/0098689 A1 | 4/2014 | Lee et al. |
| 2014/0177749 A1 | 6/2014 | Wu et al. |
| 2014/0241190 A1 | 8/2014 | Park et al. |
| 2014/0369279 A1 | 12/2014 | Yu et al. |
| 2015/0146650 A1 | 5/2015 | Ko et al. |
| 2015/0318908 A1 | 11/2015 | Ko et al. |
| 2016/0212643 A1 | 7/2016 | Park et al. |
| 2018/0212800 A1* | 7/2018 | Park ................. H04L 25/03006 |

OTHER PUBLICATIONS

European Search Report dated Jun. 27, 2018, issued in European Application No. 16835505.5-1220/3335327 PCT/KR2016008945.

* cited by examiner

METHOD AND APPARATUS FOR OPERATING BEAMFORMED REFERENCE SIGNAL IN COMMUNICATION SYSTEM

CROSS-REFERENCE TO RELATED APPLICATION(S)

This application is a continuation application of prior application Ser. No. 15/989,817, filed on May 25, 2018, which issued as U.S. Pat. No. 10,505,604 on Dec. 10, 2019, which is a continuation application of prior application Ser. No. 15/235,810, filed on Aug. 12, 2016, which issued as U.S. Pat. No. 9,985,704 on May 29, 2018, and was based on and claimed priority under 35 U.S.C. § 119(e) of a U.S. Provisional application filed on Aug. 13, 2015, in the U.S. Patent and Trademark Office, and assigned Ser. No. 62/204,582, of a U.S. Provisional application filed on Sep. 24, 2015, in the U.S. Patent and Trademark Office, and assigned Ser. No. 62/232,016, of a U.S. Provisional application filed on Oct. 13, 2015, in the U.S. Patent and Trademark Office, and assigned Ser. No. 62/240,744, and of a U.S. Provisional application filed on Oct. 23, 2015, in the U.S. Patent and Trademark Office, and assigned Ser. No. 62/245,630, the entire disclosure of each of which is hereby incorporated by reference.

TECHNICAL FIELD

The present disclosure relates to methods and apparatuses for operating beamformed reference signals in communication systems.

BACKGROUND

In order to meet the demand for wireless data traffic sorting since the fourth generation (4G) communication system came to the market, there are ongoing efforts to develop enhanced fifth generation (5G) communication systems or pre-5G communication systems. For the reasons, the 5G communication system or pre-5G communication system is called the beyond 4G network communication system or post long term evolution (LTE) system.

For higher data transmit rates, 5G communication systems are considered to be implemented on ultra-high frequency bands (mmWave), such as, e.g., 60 GHz. To mitigate pathloss on the ultra-high frequency band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation.

There are also other various schemes under development for the 5G system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

Meanwhile, MIMO technology increases channel capacity within limited frequency resources by using multiple antennas and provides channel capacity theoretically proportional to the number of antennas by multiple antennas having an excellent scattering environment.

However, MIMO technology has a limited space and area where antennas may be installed, and the inter-antenna interval has a significant influence on communication capability. That is, as the inter-antenna interval decreases, radio channels present a higher correlation. In particular, when antennas have the same polarization, radio channels have a significantly high correlation, and interference between radio channels reduces reliability and data transmission ratio of data communication.

Accordingly, various polarization directions of antennas need to be used in order to increase channel capacity while decreasing the area where multiple antennas are installed. This is why interference between radio channels may be decreased when antennas have multiple polarizations.

MIMO technology requires a precoding task for previously coding data in order to efficiently transmit data. Further, a data precoding rule represented as a matrix is called precoding matrix, and a set of precoding matrixes is called codebook.

Although various codebooks have been suggested for operation of non-beamformed reference signals, there is no suggestion as to efficient codebooks regarding operation of beamformed reference signals. Therefore, a need exists for low-complexity, high-performance schemes for generating codebooks when operating beamformed reference signals.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for operating beamformed reference signals in a communication system.

According to an embodiment of the present disclosure, there are provided a method and apparatus for generating codebooks used when generating feedback information for beamformed reference signals in a communication system.

In accordance with an aspect of the present disclosure, a method for operating a beamformed reference signal by a base station in a communication system is provided. The method includes transmitting, to a terminal, control information indicating whether a first codebook is used for generating feedback information on a downlink reference signal. The first codebook is used if generating feedback information on the beamformed reference signal and is generated based on a number of antenna ports and a number of ranks.

In accordance with another aspect of the present disclosure, a method for operating a beamformed reference signal by a terminal in a communication system is provided. The method includes receiving, from a base station, control information indicating whether a first codebook is used for generating feedback information on a downlink reference signal. The first codebook is used if generating feedback information on the beamformed reference signal and is generated based on a number of antenna ports and a number of ranks.

In accordance with another aspect of the present disclosure, a base station for operating a beamformed reference signal in a communication system is provided. The base station includes a communication unit configured to transmit and receive a relevant signal and at least one processor configured to control to transmit, to a terminal, control information indicating whether a first codebook is used for generating feedback information on a downlink reference signal. The first codebook is used if generating feedback information on the beamformed reference signal and is generated based on a number of antenna ports and a number of ranks.

In accordance with another aspect of the present disclosure, a terminal for operating a beamformed reference signal in a communication system is provided. The terminal includes a communication unit configured to transmit and receive a relevant signal and at least one processor configured to control to receive, from a base station, control information indicating whether a first codebook is used for generating feedback information on a downlink reference signal. The first codebook is used if generating feedback information on the beamformed reference signal and is generated based on a number of antenna ports and a number of ranks.

According to an embodiment of the present disclosure, beamformed reference signals may be operated in a communication system.

According to an embodiment of the present disclosure, codebooks may be generated which are used when generating feedback information for beamformed reference signals in a communication system.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
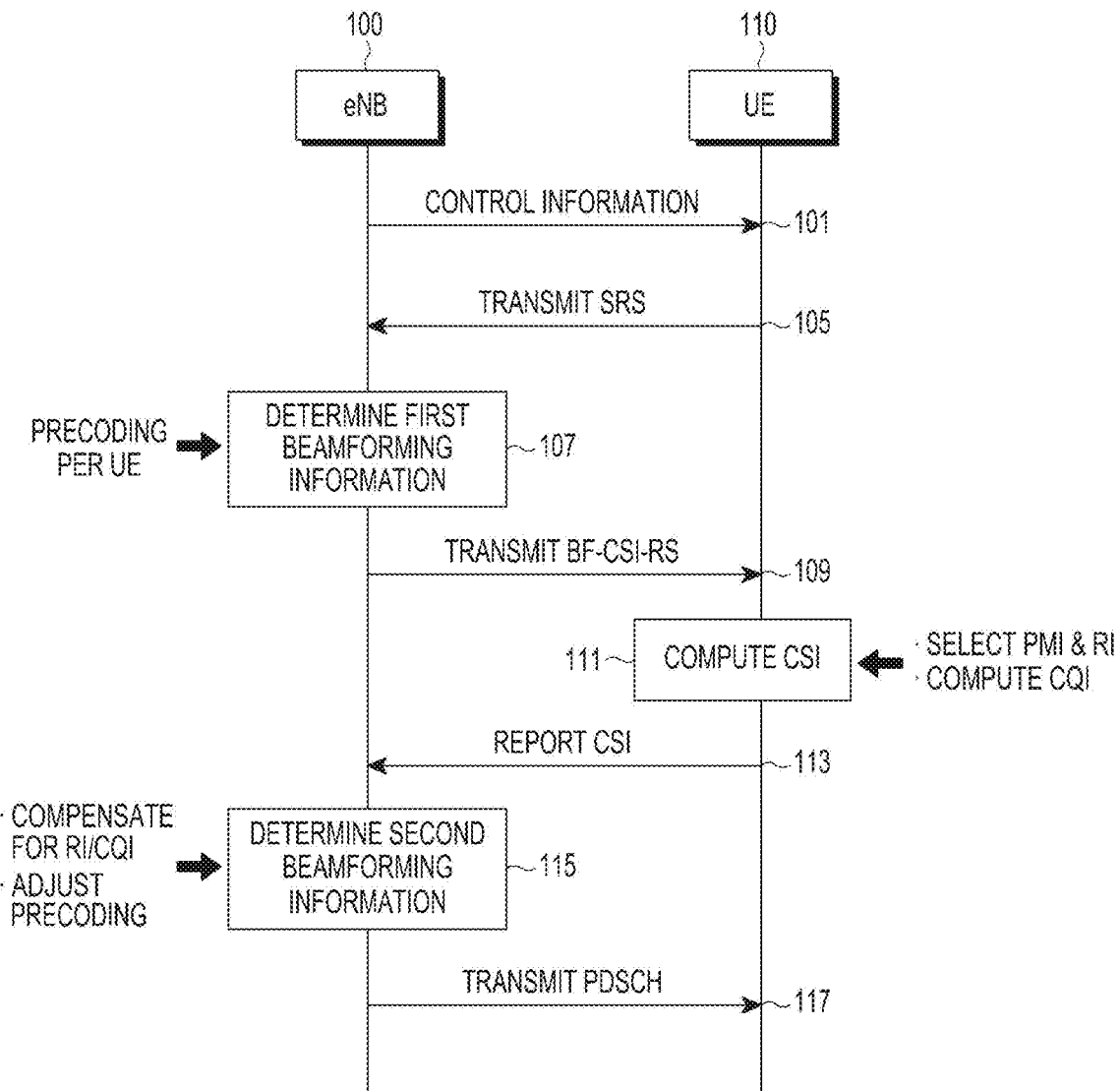
FIG. 1 is a view illustrating a scenario in which a beamformed reference signal is operated in a communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For example, the electronic device may be a smartphone, a tablet personal computer (PC), a PC, a mobile phone, a video phone, an e-book reader, a desktop PC, a laptop PC, a netbook PC, a personal digital assistant (PDA), a portable multimedia player (PMP), an Moving Picture Experts Group phase 1 or phase 2 (MPEG-1 or MPEG-2) audio layer 3 (MP3) player, a mobile medical device, a camera, a wearable device (e.g., a head-mounted device (HMD)), electronic clothes, an electronic bracelet, an electronic necklace, an electronic appcessory, an electronic tattoo, or a smart watch.

Further, according to an embodiment of the present disclosure, the electronic device may include, e.g., a smart home device, e.g., a television, a digital versatile disc (DVD) player, an audio player, a refrigerator, an air conditioner, a vacuum cleaner, an oven, a microwave oven, a washer, a dryer, an air cleaner, a set-top box, a television (TV) box, a gaming console, an electronic dictionary, a camcorder, or an electronic picture frame.

Further, according to an embodiment of the present disclosure, the electronic device includes, e.g., a medical device, a navigation device, a global positioning system (GPS) receiver, an event data recorder (EDR), a flight data recorder (FDR), an automotive infotainment device, a sailing electronic device, an aviation electronic device, a security device, or an industrial or home robot.

According to various embodiments of the disclosure, an electronic device may be a combination of the above-listed devices. It should be appreciated by one of ordinary skill in the art that the electronic device is not limited to the above-described devices.

FIG. 1 is a view illustrating a scenario in which a beamformed reference signal is operated in a communication system according to an embodiment of the present disclosure.

Referring to FIG. 1, the communication system shown includes a base station (also denoted herein as evolved nodeB (eNB)) 100 and a terminal (also denoted herein as user equipment (UE)) 110.

eNB 100 transmits control information, including a field indicating whether a first codebook is used to generate a channel state information (CSI) feedback, to UE 110 in operation 101. The first codebook means a brand-new codebook generated by a brand-new scheme as provided according to an embodiment of the present disclosure, and it is here assumed that the field contained in the control information indicates that the first codebook is used to generate the CSI feedback.

When the field contained in the control information received by UE 110 indicates that the first codebook is not used to generate the CSI feedback, UE 110 uses a second codebook, not the first codebook, to generate the CSI feedback. Here, the second feedback means a legacy codebook.

In order to use signal transmission utilizing massive multi-input multi-output (MIMO) technology, eNB 100 must determine beamforming appropriate for a channel between eNB 100 and UE 110. Time division duplexing (TDD) systems primarily determine per-UE beamforming appropriate for data transmission based on a sounding reference signal (SRS) received from UE 110, and frequency division duplexing (FDD) systems primarily determine per-UE beamforming based on CSI transmitted from UE 110.

In order to increase beamforming accuracy in a full dimensional MIMO (FD-MIMO) system, eNB 100 generates first beamforming information using feedback information on a CSI-reference signal (CSI-RS) transmitted at a long period or a sounding reference signal (SRS) transmitted from UE 110, and transmits an additional reference signal having the first beamforming information applied thereto. Here, CSI-RS means a reference signal transmitted for CSI computation. Thereafter, eNB 100 may generate more accurate second beamforming information using feedback information on CSI transmitted for the additional reference signal and may apply the second beamforming information to data transmission.

FIG. 1 illustrates an example of generating beamforming information using an SRS that eNB 100 receives from UE 110. That is, eNB 100 receives a SRS periodically transmitted from UE 110 at operation 105. Thus, eNB 100 receiving the SRS performs precoding per UE and determines first beamforming information at operation 107.

When beamforming information is generated using a CSI-RS transmitted at a long period, operation 105 of FIG. 1 may be replaced with a configuration in which eNB 100 transmits CSI-RS to UE 110 at a long period and in response receives feedback information containing CSI from UE 110.

Having determined first beamforming information, eNB 100 transmits CSI-RS having beamforming information related per transmission port applied thereto, i.e., beamforming CSI-RS (BF-CSI-RS), to UE 110 at operation 109.

UE 110 computes CSI based on the received BF-CSI-RS at operation 111. That is, UE 110 selects a precoding matrix index (PMI) and rank index (RI) based on the first codebook according to the control information received in operation 101 and computes a channel quality indicator (CQI) based on the selected PMI and RI.

Thereafter, UE 110 reports the CSI computed in operation 111 to eNB 100 at operation 113, and eNB 100 compensates for RI and CQI based on the CSI and performs precoding adjustment and determines second beamforming information at operation 115. The eNB 100 having determined second beamforming information transmits a physical downlink shared channel (PDSCH) signal having beamforming information related per transmission port applied thereto to UE 110 at operation 117.

A configuration in which control information containing a field indicating whether the first codebook is used to generate CSI feedback is transmitted before operation 105 where SRS is received has been described in connection with FIG. 1, for example. However, the control information may also be sent after operation 105 where SRS is received.

Figure 2:
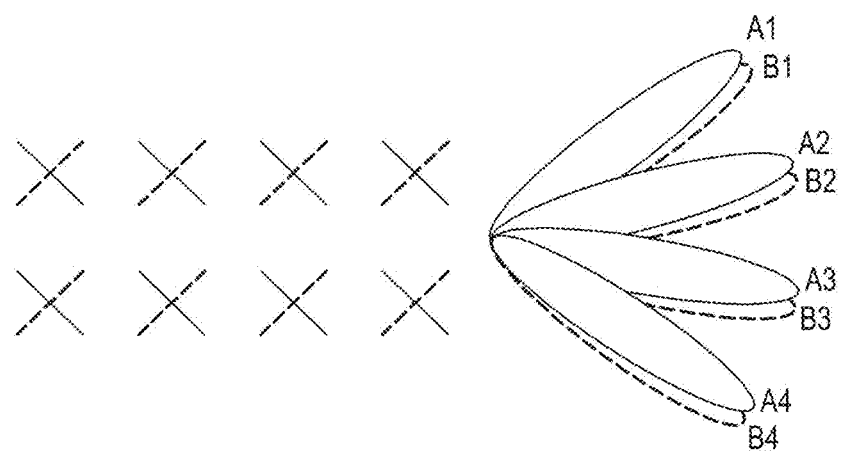
FIG. 2 is a view illustrating an example of a configuration of a reference signal port used upon transmission of a beamforming information-applied reference signal by a base station according to an embodiment of the present disclosure.

FIG. 2 is a view illustrating an example of a configuration of a reference signal port used upon transmission of a beamforming information-applied reference signal by a base station.

Referring to FIG. 2, eNB 100 may apply various schemes to configure a reference signal port, and in one embodiment, eNB 100 may configure a BF-CSI-RS per antenna polarization to utilize the characteristics of a cross polarization antenna. Here, BF-CSI-RS corresponding to each polarization may be configured in pairs. That is, eNB 100 configures a total of eight reference signal ports including four pairs (A1, B1), (A2, B2), (A3, B3), and (A4, B4) and transmits BF-CSI-RS through each port.

Beamforming information applied to BF-CSI-RS sent through each port, e.g., beamforming weight, is determined to form a signal transmission in a dominant direction considering the radio environment channel between eNB 100 and UE 110.

Generally, beam for generating codebook is a major approach for configuring a beam direction in a correlated MIMO environment as a discrete Fourier transform (DFT) vector.

However, since in operation of beamforming information-applied CSI-RS, i.e., BF-CSI-RS, a beam is used in generating a reference signal, a codebook for selecting a beam preferred by UE among received beams, rather than information configuring a beam, is necessary. In the following embodiment, a method for generating a brand new codebook used for beam selection is described.

First Embodiment: Scheme for Generating Brand New Codebook by Utilizing a Legacy Eight Transmit Antenna Port (8Tx) Codebook Structure According to a first embodiment of the present disclosure, described is a scheme for generating a brand new codebook utilizing legacy 8Tx codebook structure and using an appropriate $v_m$ vector as a beam for generating the codebook. Here, 8Tx codebook means a codebook used for eight antenna ports.

Table 1 to Table 8 represent an 8Tx codebook used according to the first embodiment of the present disclosure, and each PMI corresponds to a pair of codebook indices, where the quantities $\varphi_n$ and $v_m$ are shown by Equation 1 below. A first PMI value of $i_1 \in \{0, 1, \ldots, f(\upsilon)-1\}$ and a second PMI value of $i_2 \in \{0, 1, \ldots, g(\upsilon)-1\}$ correspond to the codebook indices $i_1$ and $i_2$ given in Table 1 to Table 8, where $f(\upsilon)=\{16,16,4,4,4,4,4,1\}$ and $g(\upsilon)=\{16,16,16,8,1,1,1,1\}$.

$$\varphi_n = e^{j\pi n/2}$$

$$v_m = [1 \, e^{j2\pi m/32} \, e^{j4\pi m/32} \, e^{j6\pi m/32}]^T \qquad \text{Equation 1}$$

Table 1 represents rank-1 codebook used according to the first embodiment of the present disclosure.

TABLE 1

| $i_1$ | $i_2$ | | | | | | | |
|---|---|---|---|---|---|---|---|---|
| | 0 | 1 | 2 | 3 | 4 | 5 | 6 | 7 |
| 0-15 | $W_{2i_1,0}^{(1)}$ | $W_{2i_1,1}^{(1)}$ | $W_{2i_1,2}^{(1)}$ | $W_{2i_1,3}^{(1)}$ | $W_{2i_1+1,0}^{(1)}$ | $W_{2i_1+1,1}^{(1)}$ | $W_{2i_1+1,2}^{(1)}$ | $W_{2i_1+1,3}^{(1)}$ |

| $i_1$ | $i_2$ | | | | | | | |
|---|---|---|---|---|---|---|---|---|
| | 8 | 9 | 10 | 11 | 12 | 13 | 14 | 15 |
| 0-15 | $W_{2i_1+2,0}^{(1)}$ | $W_{2i_1+2,1}^{(1)}$ | $W_{2i_1+2,2}^{(1)}$ | $W_{2i_1+2,3}^{(1)}$ | $W_{2i_1+3,0}^{(1)}$ | $W_{2i_1+3,1}^{(1)}$ | $W_{2i_1+3,2}^{(1)}$ | $W_{2i_1+3,3}^{(1)}$ | where $W_{m,n}^{(1)} = \frac{1}{\sqrt{8}} \begin{bmatrix} v_m \\ \varphi_n v_m \end{bmatrix}$ Table 2 represents rank-2 codebook used according to the first embodiment of the present disclosure.

TABLE 2

| $i_1$ | $i_2$ | | | |
|---|---|---|---|---|
| | 0 | 1 | 2 | 3 |
| 0-15 | $W_{2i_1,2i_1,0}^{(2)}$ | $W_{2i_1,2i_1,1}^{(2)}$ | $W_{2i_1+1,2i_1+1,0}^{(2)}$ | $W_{2i_1+1,2i_1+1,1}^{(2)}$ |

| $i_1$ | $i_2$ | | | |
|---|---|---|---|---|
| | 4 | 5 | 6 | 7 |
| 0-15 | $W_{2i_1+2,2i_1+2,0}^{(2)}$ | $W_{2i_1+2,2i_1+2,1}^{(2)}$ | $W_{2i_1+3,2i_1+3,0}^{(2)}$ | $W_{2i_1+3,2i_1+3,1}^{(2)}$ |

TABLE 2-continued

| $i_1$ | $i_2$ | | | |
|---|---|---|---|---|
| | 8 | 9 | 10 | 11 |
| 0-15 | $W_{2i_1,2i_1+1,0}^{(2)}$ | $W_{2i_1,2i_1+1,1}^{(2)}$ | $W_{2i_1+1,2i_1+2,0}^{(2)}$ | $W_{2i_1+1,2i_1+2,1}^{(2)}$ |

| $i_1$ | $i_2$ | | | |
|---|---|---|---|---|
| | 12 | 13 | 14 | 15 |
| 0-15 | $W_{2i_1,2i_1+3,0}^{(2)}$ | $W_{2i_1,2i_1+3,1}^{(2)}$ | $W_{2i_1+1,2i_1+3,0}^{(2)}$ | $W_{2i_1+1,2i_1+3,1}^{(2)}$ | where $W_{m,m',n}^{(2)} = \frac{1}{4} \begin{bmatrix} v_m & v_{m'} \\ \varphi_n v_m & -\varphi_n v_{m'} \end{bmatrix}$ Table 3 represents rank-3 codebook used according to the first embodiment of the present disclosure.

TABLE 3

| $i_1$ | $i_2$ | | | |
|---|---|---|---|---|
| | 0 | 1 | 2 | 3 |
| 0-3 | $W_{8i_1,8i_1,8i_1+8}^{(3)}$ | $W_{8i_1+8,8i_1,8i_1+8}^{(3)}$ | $\tilde{W}_{8i_1,8i_1+8,8i_1+8}^{(3)}$ | $\tilde{W}_{8i_1+8,8i_1,8i_1}^{(3)}$ |

| $i_1$ | $i_2$ | | | |
|---|---|---|---|---|
| | 4 | 5 | 6 | 7 |
| 0-3 | $W_{8i_1+2,8i_1+2,8i_1+10}^{(3)}$ | $W_{8i_1+10,8i_1+2,8i_1+10}^{(3)}$ | $\tilde{W}_{8i_1+2,8i_1+10,8i_1+10}^{(3)}$ | $\tilde{W}_{8i_1+10,8i_1+2,8i_1+2}^{(3)}$ |

| $i_1$ | $i_2$ | | | |
|---|---|---|---|---|
| | 8 | 9 | 10 | 11 |
| 0-3 | $W_{8i_1+4,8i_1+4,8i_1+12}^{(3)}$ | $W_{8i_1+12,8i_1+4,8i_1+12}^{(3)}$ | $\tilde{W}_{8i_1+4,8i_1+12,8i_1+12}^{(3)}$ | $\tilde{W}_{8i_1+12,8i_1+4,8i_1+4}^{(3)}$ |

| $i_1$ | $i_2$ | | | |
|---|---|---|---|---|
| | 12 | 13 | 14 | 15 |
| 0-3 | $W_{8i_1+6,8i_1+6,8i_1+14}^{(3)}$ | $W_{8i_1+14,8i_1+6,8i_1+14}^{(3)}$ | $\tilde{W}_{8i_1+6,8i_1+14,8i_1+14}^{(3)}$ | $\tilde{W}_{8i_1+14,8i_1+6,8i_1+6}^{(3)}$ | where $W_{m,m',m''}^{(3)} = \frac{1}{\sqrt{24}} \begin{bmatrix} v_m & v_{m'} & v_{m''} \\ v_m & -v_{m'} & -v_{m''} \end{bmatrix}$, $\tilde{W}_{m,m',m''}^{(3)} = \frac{1}{\sqrt{24}} \begin{bmatrix} v_m & v_{m'} & v_{m''} \\ v_m & v_{m'} & -v_{m''} \end{bmatrix}$ Table 4 represents rank-4 codebook used according to the first embodiment of the present disclosure.

TABLE 4

| | $i_2$ | | | |
|---|---|---|---|---|
| $i_1$ | 0 | 1 | 2 | 3 |
| 0-3 | $W_{8i_1,8i_1+8,0}^{(4)}$ | $W_{8i_1,8i_1+8,1}^{(4)}$ | $W_{8i_1+2,8i_1+10,0}^{(4)}$ | $W_{8i_1+2,8i_1+10,1}^{(4)}$ |

| | $i_2$ | | | |
|---|---|---|---|---|
| $i_1$ | 4 | 5 | 6 | 7 |
| 0-3 | $W_{8i_1+4,8i_1+12,0}^{(4)}$ | $W_{8i_1+4,8i_1+12,1}^{(4)}$ | $W_{8i_1+6,8i_1+14,0}^{(4)}$ | $W_{8i_1+6,8i_1+14,1}^{(3)}$ | where $W_{m,m',n}^{(4)} = \frac{1}{\sqrt{32}} \begin{bmatrix} v_m & v_{m'} & v_m & v_{m'} \\ \varphi_n v_m & \varphi_n v_{m'} & -\varphi_n v_m & -\varphi_n v_{m'} \end{bmatrix}$ Table 5 represents rank-5 codebook used according to the first embodiment of the present disclosure.

TABLE 5

| | $i_2$ |
|---|---|
| $i_1$ | 0 |
| 0-3 | $W_{i_1}^{(5)} = \frac{1}{\sqrt{40}} \begin{bmatrix} v_{2i_1} & v_{2i_1} & v_{2i_1+8} & v_{2i_1+8} & v_{2i_1+16} \\ v_{2i_1} & -v_{2i_1} & v_{2i_1+8} & -v_{2i_1+8} & v_{2i_1+16} \end{bmatrix}$ |

Table 6 represents rank-6 codebook used according to the first embodiment of the present disclosure.

TABLE 6

| | $i_1 \ i_2$ |
|---|---|
| $i_1$ | 0 |
| 0-3 | $W_{i_1}^{(6)} = \frac{1}{\sqrt{48}} \begin{bmatrix} v_{2i_1} & v_{2i_1} & v_{2i_1+8} & v_{2i_1+8} & v_{2i_1+16} & v_{2i_1+16} \\ v_{2i_1} & -v_{2i_1} & v_{2i_1+8} & -v_{2i_1+8} & v_{2i_1+16} & -v_{2i_1+16} \end{bmatrix}$ |

Table 7 represents rank-7 codebook used according to the first embodiment of the present disclosure.

TABLE 7

| | $i_2$ |
|---|---|
| $i_1$ | 0 |
| 0-3 | $W_{i_1}^{(7)} = \frac{1}{\sqrt{56}} \begin{bmatrix} v_{2i_1} & v_{2i_1} & v_{2i_1+8} & v_{2i_1+8} & v_{2i_1+16} & v_{2i_1+16} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} \end{bmatrix}$ |

Table 8 represents rank-8 codebook used according to the first embodiment of the present disclosure.

TABLE 8

| | $i_2$ |
|---|---|
| $i_1$ | 0 |
| 0 | $W_{i_1}^{(8)} = \frac{1}{8} \begin{bmatrix} v_{2i_1} & v_{2i_1} & v_{2i_1+8} & v_{2i_1+8} & v_{2i_1+16} & v_{2i_1+16} & v_{2i_1+24} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} & -v_{2i_1+24} \end{bmatrix}$ |

A beam set as shown in Equation 2 below is generated upon generating a rank-1 and rank-2 codebook by applying a beam for generating codebook, e.g., DFT vector $v_m = [1 \ e^{j2\pi m/32} \ e^{j4\pi m/32} \ e^{j6\pi m/32}]^T$, to the 8Tx codebook shown in Table 1 to Table 8.

$$B = [b_0 \ b_1 \ \ldots \ b_{31}], [B]_{1+m,1+n} = e^{j\frac{2\pi mn}{32}}, \quad \text{Equation 2}$$
$$m = 0, 1, 2, 3, n = 0, 1, \ldots, 31$$

In Equation 2, the B matrix is a 4×32-size matrix, and a W1 and W2 codebook is generated based on the B matrix.

In the following embodiment of the present disclosure, described is a method in which a $v_m$ vector of a proper size, e.g., 4×1 size, is utilized as a beam for generating codebook to generate an 8Tx codebook appropriate for operation of BF-CSI-RS. The $v_m$ vector may be defined by various methods, and it may be defined by applying the following rules.

Rule 1) Matrix having 1's in a ratio of 1/4 and 0's in a ratio of 3/4 in each row Rule 2) Matrix constituted of vectors having one 1 and three 0's for all the rows Rule 3) Matrix in which among a total of 32 rows, 16 sub matrixes are repeatedly or symmetrically constituted Rule 4) Matrix in which among a total of 32 rows, four consecutive rows are repeatedly configured with the order of rows recursively changed Rule 5) Matrix in which among a total of 32 rows, eight consecutive rows are repeatedly configured with the order of rows recursively changed Rule 6) Matrix utilizing the columns of the identity matrix for all the rows Further, a beam set as shown in Equation 3 below is generated upon generating a rank-1 and rank-2 codebook by applying a beam for generating codebook, e.g., DFT vector $v_m = [1 \ e^{j2\pi m/32} \ e^{j4\pi m/32} \ e^{j6\pi m/32}]^T$, to the 8Tx codebook shown in Table 1 to Table 8.

$$B = [b_0 \ b_1 \ \ldots \ b_{31}], [B]_{1+m,1+n} = e^{j\frac{2\pi mn}{32}}, \quad \text{Equation 3}$$
$$m = 0, 1, 2, 3, n = 0, 1, \ldots, 31$$

In Equation 3, the B matrix is a 4×32-size matrix, and a W1 and W2 codebook is generated based on the B matrix.

In the following embodiment of the present disclosure, described is a method in which a $v_m$ vector of a proper size, e.g., 2×1 size, is utilized as a beam for generating codebook to generate an 4Tx codebook appropriate for operation of BF-CSI-RS. Here, 4Tx codebook means a codebook used for four antenna ports. The $v_m$ vector may be defined by various methods, and it may be defined by applying the following rules.

Rule 1) Matrix having 1's in a ratio of 1/2 and 0's in a ratio of 1/2 in each row Rule 2) Matrix constituted of vectors having one 1 and one 0 for all the rows Rule 3) Matrix in which among a total of 32 rows, 16 sub matrixes are repeatedly or symmetrically constituted Rule 4) Matrix in which among a total of 32 rows, four consecutive rows are repeatedly configured with the order of rows recursively changed Rule 5) Matrix in which among a total of 32 rows, eight consecutive rows are repeatedly configured with the order of rows recursively changed Rule 6) Matrix utilizing the columns of the identity matrix for all the rows Further, a beam set as shown in Equation 4 below is generated upon generating a rank-3 and rank-8 codebook by applying a beam for generating codebook, e.g., DFT vector $v_m = [1 \ e^{j2\pi m/32} \ e^{j4\pi m/32} \ e^{j6\pi m/32}]^T$, to the 8Tx codebook shown in Table 1 to Table 8.

$$B = [b_0 \ b_1 \ ... \ b_{15}], [B]_{1+m,1+n} = e^{j\frac{2\pi mn}{16}}, \quad \text{Equation 4}$$

$$m = 0, 1, 2, 3, n = 0, 1, ... , 15$$

In Equation 4, the B matrix is a 4×16-size matrix, and a W1 and W2 codebook is generated based on the B matrix.

In the following embodiment of the present disclosure, described is a method in which a $v_m$ vector of a proper size, e.g., 4×1 size, is utilized as a beam for generating codebook to generate an 8Tx codebook appropriate for operation of BF-CSI-RS. The $v_m$ vector may be defined by various methods, and it may be defined by applying the following rules.

Rule 5) Matrix in which among a total of 16 rows, eight consecutive rows are repeatedly configured with the order of rows recursively changed Rule 6) Matrix utilizing the columns of the identity matrix for all the rows Second Embodiment: Scheme for Generating Brand New Codebook by Utilizing a Predetermined Codebook Structure According to a second embodiment of the present disclosure, described is a scheme for generating a brand new codebook utilizing a codebook structure other than the legacy 8Tx codebook structure and using an appropriate $v_m$ vector as beam for generating codebook.

In one embodiment, when a codebook other than the legacy 8Tx codebook is used in future standards, the $v_m$ vector used in the codebook may be utilized as a proper beam for generating a codebook to generate a brand-new codebook. For example, a future standard may use the rank-1 and rank-2 codebook as shown in Tables 9 and 10 below.

Equation 5 and Table 9 represent rank-1 codebook.

$$W^{(1)}_{m_1,m_2,n} = \frac{1}{\sqrt{Q}} \begin{bmatrix} v_{m_1} \otimes u_{m_2} \\ \varphi_n v_{m_1} \otimes u_{m_2} \end{bmatrix} \quad \text{Equation 5}$$

$$\varphi_n = e^{j\pi n/2},$$

$$v_{m_1} = \begin{bmatrix} 1 \ e^{j\frac{2\pi m_1}{o_1 N_1}} \ ... \ e^{j\frac{2\pi m_1(N_1-1)}{o_1 N_1}} \end{bmatrix}^t,$$

$$u_{m_2} = \begin{bmatrix} 1 \ e^{j\frac{2\pi m_2}{o_2 N_2}} \ ... \ e^{j\frac{2\pi m_2(N_2-1)}{o_2 N_2}} \end{bmatrix}^t$$

TABLE 9

| | Rank-1 codebook | | | |
|---|---|---|---|---|
| $i_2'$ | 0 | 1 | 2 | 3 |
| Precoder | $W^{(1)}_{s_1 i_{1,1}, s_2 i_{1,2}, 0}$ | $W^{(1)}_{s_1 i_{1,1}, s_2 i_{1,2}, 1}$ | $W^{(1)}_{s_1 i_{1,1}, s_2 i_{1,2}, 2}$ | $W^{(1)}_{s_1 i_{1,1}, s_2 i_{1,2}, 3}$ |
| $i_2'$ | 4 | 5 | 6 | 7 |
| Precoder | $W^{(1)}_{s_1 i_{1,1}+1, s_2 i_{1,2}, 0}$ | $W^{(1)}_{s_1 i_{1,1}+1, s_2 i_{1,2}, 1}$ | $W^{(1)}_{s_1 i_{1,1}+1, s_2 i_{1,2}, 2}$ | $W^{(1)}_{s_1 i_{1,1}+1, s_2 i_{1,2}, 3}$ |
| $i_2'$ | 8 | 9 | 10 | 11 |
| Precoder | $W^{(1)}_{s_1 i_{1,1}+2, s_2 i_{1,2}, 0}$ | $W^{(1)}_{s_1 i_{1,1}+2, s_2 i_{1,2}, 1}$ | $W^{(1)}_{s_1 i_{1,1}+2, s_2 i_{1,2}, 2}$ | $W^{(1)}_{s_1 i_{1,1}+2, s_2 i_{1,2}, 3}$ |
| $i_2'$ | 12 | 13 | 14 | 15 |
| Precoder | $W^{(1)}_{s_1 i_{1,1}+3, s_2 i_{1,2}, 0}$ | $W^{(1)}_{s_1 i_{1,1}+3, s_2 i_{1,2}, 1}$ | $W^{(1)}_{s_1 i_{1,1}+3, s_2 i_{1,2}, 2}$ | $W^{(1)}_{s_1 i_{1,1}+3, s_2 i_{1,2}, 3}$ |
| $i_2'$ | 16-31 | | | |
| Precoder | Entries 16-31 contstructed with replacing the second subscript $s_2 i_{1,2}$ with $s_2 i_{1,2} + 1$ in entries 0-15. | | | |

Rule 1) Matrix having 1's in a ratio of 1/4 and 0's in a ratio of 3/4 in each row Rule 2) Matrix constituted of vectors having one 1 and three 0's for all the rows Rule 3) Matrix in which among a total of 16 rows, 8 sub matrixes are repeatedly or symmetrically constituted Rule 4) Matrix in which among a total of 16 rows, four consecutive rows are repeatedly configured with the order of rows recursively changed Equation 6 and Table 10 represent rank-2 codebook.

$$W^{(2)}_{m_1,m_2,m_1',m_2'} = \frac{1}{\sqrt{2Q}} \begin{bmatrix} v_{m_1} \otimes u_{m_2} & v_{m_1'} \otimes u_{m_2'} \\ \varphi_n v_{m_1} \otimes u_{m_2} & -\varphi_n v_{m_1'} \otimes u_{m_2'} \end{bmatrix} \quad \text{Equation 6}$$

$$\varphi_n = e^{j\pi n/2},$$

-continued $$v_{m_1} = \begin{bmatrix} 1 & e^{j\frac{2\pi m_1}{o_1 N_1}} & \ldots & e^{j\frac{2\pi m_1(N_1-1)}{o_1 N_1}} \end{bmatrix}^t,$$

$$u_{m_2} = \begin{bmatrix} 1 & e^{j\frac{2\pi m_2}{o_2 N_2}} & \ldots & e^{j\frac{2\pi m_2(N_2-1)}{o_2 N_2}} \end{bmatrix}^t$$

$i_{1,1} = 0, 1, \ldots, O_1 N_1 / s_1 - 1,$ $i_{1,2} = 0, 1, \ldots, O_2 N_2 / s_2 - 1,$ $p_1 = 1,$ and $p_2 = 1$ TABLE 11-continued

| Config for rank-1 | Selected i'2 indices | (s1, s2) |
|---|---|---|
| 3 | See, FIG. 10C   0-3, 8-11, 20-23, 28-31 | (2, 2) |
| 4 | See, FIG. 10D   0-15 | (2, 2) |

Table 12 and FIGS. 11A, 11B, 11C, and 11D represent a portion of the rank-2 codebook shown in Table 10 as a brand-new codebook.

TABLE 10

Rank-2 codebook

| $i_2'$ | 0 | 1 | 2 |
|---|---|---|---|
| $i_{1,1}, i_{1,2}$ | $W^{(2)}_{s_1 i_{1,1}, s_2 i_{1,2}, s_1 i_{1,1}, s_2 i_{1,2}, 0}$ | $W^{(2)}_{s_1 i_{1,1}, s_2 i_{1,2}, s_1 i_{1,1}, s_2 i_{1,2}, 1}$ | $W^{(2)}_{s_1 i_{1,1}+p_1, s_2 i_{1,2}, s_1 i_{1,1}+p_1, s_2 i_{1,2}, 0}$ |
| $i_2'$ | 3 | 4 | 5 |
| $i_{1,1}, i_{1,2}$ | $W^{(2)}_{s_1 i_{1,1}+p_1, s_2 i_{1,2}, s_1 i_{1,1}+p_1, s_2 i_{1,2}, 1}$ | $W^{(2)}_{s_1 i_{1,1}+2p_1, s_2 i_{1,2}, s_1 i_{1,1}+2p_1, s_2 i_{1,2}, 0}$ | $W^{(2)}_{s_1 i_{1,1}+2p_1, s_2 i_{1,2}, s_1 i_{1,1}+2p_1, s_2 i_{1,2}, 1}$ |
| $i_2'$ | 6 | 7 | 8 |
| $i_{1,1}, i_{1,2}$ | $W^{(2)}_{s_1 i_{1,1}+3p_1, s_2 i_{1,2}, s_1 i_{1,1}+3p_1, s_2 i_{1,2}, 0}$ | $W^{(2)}_{s_1 i_{1,1}+3p_1, s_2 i_{1,2}, s_1 i_{1,1}+3p_1, s_2 i_{1,2}, 1}$ | $W^{(2)}_{s_1 i_{1,1}, s_2 i_{1,2}, s_1 i_{1,1}+p_1, s_2 i_{1,2}, 0}$ |
| $i_2'$ | 9 | 10 | 11 |
| $i_{1,1}, i_{1,2}$ | $W^{(2)}_{s_1 i_{1,1}, s_2 i_{1,2}, s_1 i_{1,1}+p_1, s_2 i_{1,2}, 1}$ | $W^{(2)}_{s_1 i_{1,1}+p_1, s_2 i_{1,2}, s_1 i_{1,1}+2p_1, s_2 i_{1,2}, 0}$ | $W^{(2)}_{s_1 i_{1,1}+p_1, s_2 i_{1,2}, s_1 i_{1,1}+2p_1, s_2 i_{1,2}, 1}$ |
| $i_2'$ | 12 | 13 | 14 |
| $i_{1,1}, i_{1,2}$ | $W^{(2)}_{s_1 i_{1,1}, s_2 i_{1,2}, s_1 i_{1,1}+3p_1, s_2 i_{1,2}, 0}$ | $W^{(2)}_{s_1 i_{1,1}, s_2 i_{1,2}, s_1 i_{1,1}+3p_1, s_2 i_{1,2}, 1}$ | $W^{(2)}_{s_1 i_{1,1}+p_1, s_2 i_{1,2}, s_1 i_{1,1}+3p_1, s_2 i_{1,2}, 0}$ |
| $i_2'$ | 15 | 16 | 17 |
| $i_{1,1}, i_{1,2}$ | $W^{(2)}_{s_1 i_{1,1}+p_1, s_2 i_{1,2}, s_1 i_{1,1}+3p_1, s_2 i_{1,2}, 1}$ | $W^{(2)}_{s_1 i_{1,1}, s_2 i_{1,2}+p_2, s_1 i_{1,1}, s_2 i_{1,2}+p_2, 0}$ | $W^{(2)}_{s_1 i_{1,1}, s_2 i_{1,2}+p_2, s_1 i_{1,1}, s_2 i_{1,2}+p_2, 1}$ |
| $i_2'$ | 18 | 19 | 20 |
| $i_{1,1}, i_{1,2}$ | $W^{(2)}_{s_1 i_{1,1}+p_1, s_2 i_{1,2}+p_2, s_1 i_{1,1}+p_1, s_2 i_{1,2}+p_2, 0}$ | $W^{(2)}_{s_1 i_{1,1}+p_1, s_2 i_{1,2}+p_2, s_1 i_{1,1}+p_1, s_2 i_{1,2}+p_2, 1}$ | $W^{(2)}_{s_1 i_{1,1}+3p_1, s_2 i_{1,2}+p_2, s_1 i_{1,1}+3p_1, s_2 i_{1,2}+p_2, 0}$ |
| $i_2'$ | 21 | 22 | 23 |
| $i_{1,1}, i_{1,2}$ | $W^{(2)}_{s_1 i_{1,1}+3p_1, s_2 i_{1,2}+p_2, s_1 i_{1,1}+3p_1, s_2 i_{1,2}+p_2, 1}$ | $W^{(2)}_{s_1 i_{1,1}, s_2 i_{1,2}+p_2, s_1 i_{1,1}+p_1, s_2 i_{1,2}+p_2, 0}$ | $W^{(2)}_{s_1 i_{1,1}, s_2 i_{1,2}+p_2, s_1 i_{1,1}+p_1, s_2 i_{1,2}+p_2, 1}$ |
| $i_2'$ | 24 | 25 | 26 |
| $i_{1,1}, i_{1,2}$ | $W^{(2)}_{s_1 i_{1,1}+p_1, s_2 i_{1,2}+p_2, s_1 i_{1,1}+2p_1, s_2 i_{1,2}+p_2, 0}$ | $W^{(2)}_{s_1 i_{1,1}+p_1, s_2 i_{1,2}+p_2, s_1 i_{1,1}+2p_1, s_2 i_{1,2}+p_2, 1}$ | $W^{(2)}_{s_1 i_{1,1}+p_1, s_2 i_{1,2}+p_2, s_1 i_{1,1}+3p_1, s_2 i_{1,2}+p_2, 0}$ |
| $i_2'$ | 27 | 28 | 29 |
| $i_{1,1}, i_{1,2}$ | $W^{(2)}_{s_1 i_{1,1}+p_1, s_2 i_{1,2}+p_2, s_1 i_{1,1}+3p_1, s_2 i_{1,2}+p_2, 1}$ | $W^{(2)}_{s_1 i_{1,1}, s_2 i_{1,2}, s_1 i_{1,1}, s_2 i_{1,2}+p_2, 0}$ | $W^{(2)}_{s_1 i_{1,1}, s_2 i_{1,2}, s_1 i_{1,1}, s_2 i_{1,2}+p_2, 1}$ |
| $i_2'$ | 30 | 31 | |
| $i_{1,1}, i_{1,2}$ | $W^{(2)}_{s_1 i_{1,1}+p_1, s_2 i_{1,2}+p_2, s_1 i_{1,1}+p_1, s_2 i_{1,2}+p_2, 0}$ | $W^{(2)}_{s_1 i_{1,1}+p_1, s_2 i_{1,2}+p_2, s_1 i_{1,1}+p_1, s_2 i_{1,2}+p_2, 1}$ | |

An eNB may designate an additional configuration as shown in Tables 11 and 12 based on the codebook shown in Tables 9 and 10. A portion of the codebook shown in Tables 9 and 10 may be used as a brand new codebook according to each configuration.

Table 11 and FIGS. 10A, 10B, 10C, and 10D represent a portion of the rank-1 codebook shown in Table 9 as a brand-new codebook.

TABLE 11

| Config for rank-1 | Selected i'2 indices | (s1, s2) |
|---|---|---|
| 1 | See, FIG. 10A   0-3 | (1, 1) |
| 2 | See, FIG. 10B   0-7, 16-23 | (2, 2) |

TABLE 12

Figure 11A:
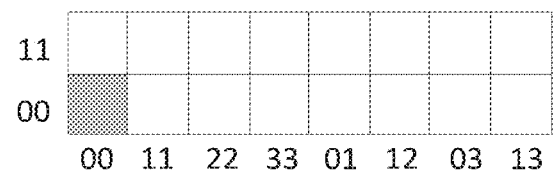
FIGS. 11A, 11B, 11C, and 11D are codebook representations according to an embodiment of the present disclosure.
Figure 11B:
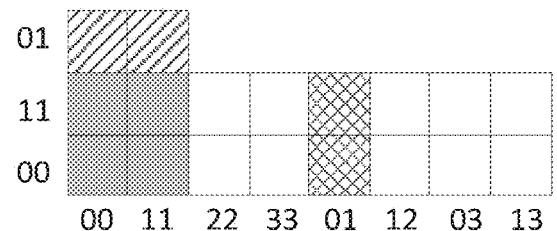
Figure 11C:
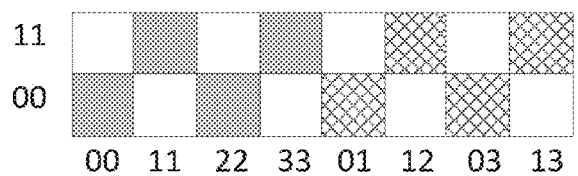
Figure 11D:
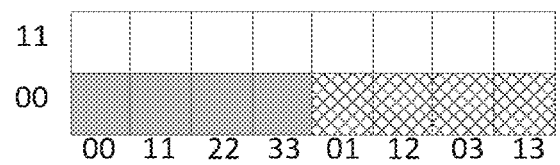

| Config for rank-2 | Selected $i_2'$ indices | (s1, s2) |
|---|---|---|
| 1 | See, FIG. 11A   0-1 | (1, 1) |
| 2 | See, FIG. 11B   0-3, 8-9, 16-19, 22-23, 28-31 | (2, 2) |
| 3 | See, FIG. 11C   0-1, 4-5, 8-9, 12-13, 18-21, 24-27 | (2, 2) |
| 4 | See, FIG. 11D   0-15 | (2, 2) |

According to the second embodiment of the present disclosure, $$v_{m_1} = \sqrt{\frac{Q}{2}}\, e_{m_1}^{(N_p/2)}$$

and $u_{m_2}=1$ may be used as beams for generating codebook to generate a brand-new assuming configuration 4 in the codebook shown in Tables 11 and 12. Here, $N_p$ denotes the number of antenna ports, and the $e_i^{(N)}$ vector is a vector of N size in which the ith element is 1, and the other elements are 0's.

Table 13 represents a 4Tx codebook generated for each of rank-1 and rank-2 generated based on the codebook shown in Tables 11 and 12. Here, 4Tx codebook means a codebook used for four antenna ports. It is assumed in Table 13 below that the brand-new codebook starts from element index 0.

TABLE 13

| Codebook index | Rank-1 codebook | Rank-2 codebook |
|---|---|---|
| 0 | $\begin{bmatrix} e_0 \\ e_0 \end{bmatrix}$ | $\begin{bmatrix} e_0 & e_0 \\ e_0 & -e_0 \end{bmatrix}$ |
| 1 | $\begin{bmatrix} e_0 \\ -e_0 \end{bmatrix}$ | $\begin{bmatrix} e_0 & e_0 \\ je_0 & -je_0 \end{bmatrix}$ |
| 2 | $\begin{bmatrix} e_0 \\ j \cdot e_0 \end{bmatrix}$ | $\begin{bmatrix} e_1 & e_1 \\ e_1 & -e_1 \end{bmatrix}$ |
| 3 | $\begin{bmatrix} e_0 \\ -j \cdot e_0 \end{bmatrix}$ | $\begin{bmatrix} e_1 & e_1 \\ je_1 & -je_1 \end{bmatrix}$ |
| 4 | $\begin{bmatrix} e_1 \\ e_1 \end{bmatrix}$ | $\begin{bmatrix} e_0 & e_1 \\ e_0 & -e_1 \end{bmatrix}$ |
| 5 | $\begin{bmatrix} e_1 \\ -e_1 \end{bmatrix}$ | $\begin{bmatrix} e_0 & e_1 \\ je_0 & -je_1 \end{bmatrix}$ |
| 6 | $\begin{bmatrix} e_1 \\ j \cdot e_1 \end{bmatrix}$ | $\begin{bmatrix} e_1 & e_0 \\ e_1 & -e_0 \end{bmatrix}$ |
| 7 | $\begin{bmatrix} e_1 \\ -j \cdot e_1 \end{bmatrix}$ | $\begin{bmatrix} e_1 & e_0 \\ je_1 & -je_0 \end{bmatrix}$ |

Table 14 represents the 8Tx codebook generated for each of rank-1 and rank-2 generated based on the codebook shown in Tables 11 and 12. Here, the 8Tx codebook means a codebook used for eight antenna ports, and the brand new codebook shown in Table 14 below is assumed to start from element index 0.

TABLE 14

| Codebook index | Rank-1 codebook | Rank-2 codebook |
|---|---|---|
| 0 | $\begin{bmatrix} e_0 \\ e_0 \end{bmatrix}$ | $\begin{bmatrix} e_0 & e_0 \\ e_0 & -e_0 \end{bmatrix}$ |
| 1 | $\begin{bmatrix} e_0 \\ -e_0 \end{bmatrix}$ | $\begin{bmatrix} e_0 & e_0 \\ je_0 & -je_0 \end{bmatrix}$ |
| 2 | $\begin{bmatrix} e_0 \\ j \cdot e_0 \end{bmatrix}$ | $\begin{bmatrix} e_1 & e_1 \\ e_1 & -e_1 \end{bmatrix}$ |
| 3 | $\begin{bmatrix} e_0 \\ -j \cdot e_0 \end{bmatrix}$ | $\begin{bmatrix} e_1 & e_1 \\ je_1 & -je_1 \end{bmatrix}$ |
| 4 | $\begin{bmatrix} e_1 \\ e_1 \end{bmatrix}$ | $\begin{bmatrix} e_2 & e_2 \\ e & -e_2 \end{bmatrix}$ |
| 5 | $\begin{bmatrix} e_1 \\ -e_1 \end{bmatrix}$ | $\begin{bmatrix} e_2 & e_2 \\ je_2 & -je_2 \end{bmatrix}$ |
| 6 | $\begin{bmatrix} e_1 \\ j \cdot e_1 \end{bmatrix}$ | $\begin{bmatrix} e_3 & e_3 \\ e_3 & -e_3 \end{bmatrix}$ |
| 7 | $\begin{bmatrix} e_1 \\ -j \cdot e_1 \end{bmatrix}$ | $\begin{bmatrix} e_3 & e_3 \\ je_3 & -je_3 \end{bmatrix}$ |
| 8 | $\begin{bmatrix} e_2 \\ e_2 \end{bmatrix}$ | $\begin{bmatrix} e_0 & e_1 \\ e_0 & -e_1 \end{bmatrix}$ |
| 9 | $\begin{bmatrix} e_2 \\ -e_2 \end{bmatrix}$ | $\begin{bmatrix} e_0 & e_1 \\ je_0 & -je_1 \end{bmatrix}$ |
| 10 | $\begin{bmatrix} e_2 \\ j \cdot e_0 \end{bmatrix}$ | $\begin{bmatrix} e_1 & e_2 \\ e_1 & -e_2 \end{bmatrix}$ |
| 11 | $\begin{bmatrix} e_2 \\ -j \cdot e_2 \end{bmatrix}$ | $\begin{bmatrix} e_1 & e_2 \\ je_1 & -je_2 \end{bmatrix}$ |
| 12 | $\begin{bmatrix} e_3 \\ e_3 \end{bmatrix}$ | $\begin{bmatrix} e_0 & e_3 \\ e_0 & -e_3 \end{bmatrix}$ |
| 13 | $\begin{bmatrix} e_3 \\ -e_3 \end{bmatrix}$ | $\begin{bmatrix} e_0 & e_3 \\ je_0 & -je_3 \end{bmatrix}$ |
| 14 | $\begin{bmatrix} e_3 \\ j \cdot e_3 \end{bmatrix}$ | $\begin{bmatrix} e_1 & e_3 \\ e_1 & -e_3 \end{bmatrix}$ |
| 15 | $\begin{bmatrix} e_3 \\ -j \cdot e_3 \end{bmatrix}$ | $\begin{bmatrix} e_1 & e_3 \\ je_1 & -je_3 \end{bmatrix}$ |

Other than the rank-1 and rank-2 codebook described above, rank-3 and rank-4 codebook as shown in Tables 15 and 16 below may be used in the future standard.

Equation 7 and Table 15 represent Rank-3 codebook.

$$W^{(3)}_{m_1,m_1',m_2,m_2'} = \frac{1}{\sqrt{3Q}}\begin{bmatrix} v_{m_1} \otimes u_{m_2} & v_{m_1} \otimes u_{m_2} & v_{m_1'} \otimes u_{m_2'} \\ v_{m_1} \otimes u_{m_2} & -v_{m_1} \otimes u_{m_2} & -v_{m_1'} \otimes u_{m_2'} \end{bmatrix},$$

$$\tilde{W}^{(3)}_{m_1,m_1',m_2,m_2'} = \frac{1}{\sqrt{3Q}}\begin{bmatrix} v_{m_1} \otimes u_{m_2} & v_{m_1'} \otimes u_{m_2'} & v_{m_1'} \otimes u_{m_2'} \\ v_{m_1} \otimes u_{m_2} & v_{m_1'} \otimes u_{m_2'} & -v_{m_1'} \otimes u_{m_2'} \end{bmatrix}, \text{ or}$$

$$\varphi_n = e^{j\pi n/2},$$

$$v_{m_1} = \begin{bmatrix} 1 & e^{j\frac{2\pi m_1}{o_1 N_1}} & \ldots & e^{j\frac{2\pi m_1(N_1-1)}{o_1 N_1}} \end{bmatrix}^t,$$

$$u_{m_2} = \begin{bmatrix} 1 & e^{j\frac{2\pi m_2}{o_2 N_2}} & \ldots & e^{j\frac{2\pi m_2(N_2-1)}{o_2 N_2}} \end{bmatrix}^t$$

TABLE 15

| | Rank-3 codebook | | |
|---|---|---|---|
| $i_2'$ | 0 | 1 | 2 |
| $i_{1,1}$, $i_{1,2}$, k | $W^{(3)}_{s_1i_{1,1},s_1i_{1,1}+\delta_1,s_2i_{1,1},s_2i_{1,2}+\delta_2}$ | $W^{(3)}_{s_1i_{1,1},s_1i_{1,1}+\delta_1,s_2i_{1,2}+\delta_2,s_2i_{1,2}}$ | $\tilde{W}^{(3)}_{s_1i_{1,1},s_1i_{1,1}+\delta_1,s_2i_{1,2},s_2i_{1,2}+\delta_2}$ |
| $i_2'$ | 3 | 4 | 5 |
| $i_{1,1}$, $i_{1,2}$, k | $\tilde{W}^{(3)}_{s_1i_{1,1}+\delta_1,s_1i_{1,1},s_2i_{1,2}+\delta_2,s_2i_{1,2}}$ | $W^{(3)}_{s_1i_{1,1}+p_1,s_1i_{1,1}+p_1+\delta_1,s_2i_{1,2},s_2i_{1,2}+\delta_2}$ | $W^{(3)}_{s_1i_{1,1}+p_1+\delta_1,s_1i_{1,1}+p_1,s_2i_{1,2}+\delta_2,s_2i_{1,2}}$ |
| $i_2'$ | 6 | 7 | 8 |
| $i_{1,1}$, $i_{1,2}$, k | $\tilde{W}^{(3)}_{s_1i_{1,1}+p_1,s_1i_{1,1}+p_1+\delta_1,s_2i_{1,2},s_2i_{1,2}+\delta_2}$ | $\tilde{W}^{(3)}_{s_1i_{1,1}+p_1+\delta_1,s_1i_{1,1}+p_1,s_2i_{1,2},s_2i_{1,2}+\delta_2}$ | $W^{(3)}_{s_1i_{1,1}+2p_1,s_1i_{1,1}+2p_1+\delta_1,s_2i_{1,2},s_2i_{1,2}+\delta_2}$ |
| $i_2'$ | 9 | 10 | 11 |
| $i_{1,1}$, $i_{1,2}$, k | $W^{(3)}_{s_1i_{1,1}+2p_1+\delta_1,s_1i_{1,1}+2p_1,s_2i_{1,2}+\delta_2,s_2i_{1,2}}$ | $\tilde{W}^{(3)}_{s_1i_{1,1}+2p_1,s_1i_{1,1}+2p_1+\delta_1,s_2i_{1,2},s_2i_{1,2}+\delta_2}$ | $\tilde{W}^{(3)}_{s_1i_{1,1}+2p_1+\delta_1,s_1i_{1,1}+2p_1,s_2i_{1,2},s_2i_{1,2}+\delta_2}$ |
| $i_2'$ | 12 | 13 | 14 |
| $i_{1,1}$, $i_{1,2}$, k | $W^{(3)}_{s_1i_{1,1}+3p_1,s_1i_{1,1}+3p_1+\delta_1,s_2i_{1,1},s_2i_{1,2}+\delta_2}$ | $W^{(3)}_{s_1i_{1,1}+3p_1+\delta_1,s_1i_{1,1}+3p_1,s_2i_{1,2}+\delta_2,s_2i_{1,2}}$ | $\tilde{W}^{(3)}_{s_1i_{1,1}+3p_1,s_1i_{1,1}+3p_1+\delta_1,s_2i_{1,1},s_2i_{1,2}+\delta_2}$ |
| $i_2'$ | 15 | | |
| $i_{1,1}$, $i_{1,2}$, k | $\tilde{W}^{(3)}_{s_1i_{1,1}+3p_1+\delta_1,s_1i_{1,1}+3p_1,s_2i_{1,2}+\delta_2,s_2i_{1,2}}$ | | |
| $i_2'$ | 16-31 | | |
| $i_{1,1}$, $i_{1,2}$, k | Entries 16-31 constructed with replacing $s_2i_{1,2}$ in third and fourth subscripts with $s_2i_{1,2} + p_2$ in entries 0-15. | | |

Equation 8 and Table 16 represent rank-4 codebook.

$$W^{(4)}_{m_1,m_1',m_2,m_2',n} = \frac{1}{\sqrt{4Q}} \begin{bmatrix} v_{m_1} \otimes u_{m_2} & v_{m_1'} \otimes u_{m_2'} & v_{m_1} \otimes u_{m_2} & v_{m_1'} \otimes u_{m_2'} \\ \varphi_n v_{m_1} \otimes u_{m_2} & \varphi_n v_{m_1'} \otimes u_{m_2'} & -\varphi_n v_{m_1} \otimes u_{m_2} & -\varphi_n v_{m_1'} \otimes u_{m_2'} \end{bmatrix}$$

$$\varphi_n = e^{j\pi n/2},$$

$$v_{m_1} = \begin{bmatrix} 1 & e^{j\frac{2\pi m_1}{o_1 N_1}} & \dots & e^{j\frac{2\pi m_1 (N_1-1)}{o_1 N_1}} \end{bmatrix}^t,$$

$$u_{m_2} = \begin{bmatrix} 1 & e^{j\frac{2\pi m_2}{o_2 N_2}} & \dots & e^{j\frac{2\pi m_2 (N_2-1)}{o_2 N_2}} \end{bmatrix}^t$$

Equation 8

TABLE 16

| | Rank-4 codebook | | |
|---|---|---|---|
| $i_2'$ | 0 | 1 | 2 |
| $i_{1,1}$, $i_{1,2}$, k | $W^{(4)}_{s_1i_{1,1},s_1i_{1,1}+\delta_1,s_2i_{1,1},s_2i_{1,1}+\delta_2,0}$ | $W^{(4)}_{s_1i_{1,1},s_1i_{1,1}+\delta_1,s_2i_{1,1},s_2i_{1,1}+\delta_2,1}$ | $W^{(4)}_{s_1i_{1,1}+p_1,s_1i_{1,1}+p_1+\delta_1,s_2i_{1,2},s_2i_{1,2}+\delta_2,0}$ |
| $i_2'$ | 3 | 4 | 5 |
| $i_{1,1}$, $i_{1,2}$, k | $W^{(4)}_{s_1i_{1,1}+p_1,s_1i_{1,1}+p_1+\delta_1,s_2i_{1,2},s_2i_{1,2}+\delta_2,1}$ | $W^{(4)}_{s_1i_{1,1}+2p_1,s_1i_{1,1}+2p_1+\delta_1,s_2i_{1,2},s_2i_{1,2}+\delta_2,0}$ | $W^{(4)}_{s_1i_{1,1}+2p_1,s_1i_{1,1}+2p_1+\delta_1,s_2i_{1,2},s_2i_{1,2}+\delta_2,1}$ |
| $i_2'$ | 6 | 7 | |
| $i_{1,1}$, $i_{1,2}$, k | $W^{(4)}_{s_1i_{1,1}+3p_1,s_1i_{1,1}+3p_1+\delta_1,s_2i_{1,1},s_2i_{1,2}+\delta_2,0}$ | $W^{(4)}_{s_1i_{1,1}+3p_1,s_1i_{1,1}+3p_1+\delta_1,s_2i_{1,1},s_2i_{1,2}+\delta_2,1}$ | |
| $i_2'$ | 8-15 | | |
| $i_{1,1}$, $i_{1,2}$, k | Entries 8-15 constructed with replacing $s_2i_{1,2}$ in third and fourth subscripts with $s_2i_{1,2} + p_2$ in entries 0-7. | | |

An eNB and UE may designate an additional configuration as shown in Table 17 below based on the codebook shown in Tables 15 and 16. A portion of the codebook shown in Tables 15 and 16 may be used as a brand new codebook according to each configuration.

Table 17 represents orthogonal beam type for $\delta_1$ and $\delta_2$.

TABLE 17

| | | | k | | |
|---|---|---|---|---|---|
| | $\delta$ | 0 | 1 | 2 | 3 |
| If $N_1 > 1$ and $N_2 > 1$ | $\delta_1$ | $O_1$ | 0 | $O_1$ | $(N_1 - 1)O_1$ |
| | $\delta_2$ | 0 | $O_2$ | $O_2$ | 0 |
| If $N_2 = 1$ | $\delta_1$ | $O_1$ | $2O_1$ | $3O_1$ | $(N_1 - 1)O_1$ |
| | $\delta_2$ | 0 | 0 | 0 | 0 |

Table 18 represents configurations 1 to 4 for index $i'_2$ selected to report rank-3 CSI, and Table 19 represents configurations 1 to 4 for index $i'_2$ selected to report rank-4 CSI.

TABLE 18

Selected $i_2'$ indices for rank-3 CSI reporting

| Config | Selected $i_2'$ indices | (s1, s2) | ($p_1$, $p_2$) |
|---|---|---|---|
| 1 | 0, 2 | (1, 1) | (1, 1) |
| 2 | 0-7, 16-23 | ($O_1$, $O_2$) | $\left(\frac{O_1}{2}, \frac{O_2}{2}\right)$ |
| 3 | 0-3, 8-11, 20-23, 28-31 | ($O_1$, $O_2$) | $\left(\frac{O_1}{4}, \frac{O_2}{2}\right)$ |
| 4 | 0-15 | ($O_1$, 2) | $\left(\frac{O_1}{4}, -\right)$ |

TABLE 19

Selected $i_2'$ indices for rank-4 CSI reporting

| Config | Selected $i_2'$ indices | (s1, s2) | ($p_1$, $p_2$) |
|---|---|---|---|
| 1 | 0, 1 | (1, 1) | (1, 1) |
| 2 | 0-3, 8-11 | ($O_1$, $O_2$) | $\left(\frac{O_1}{2}, \frac{O_2}{2}\right)$ |
| 3 | 0-1, 4-5, 10-11, 14-15 | ($O_1$, $O_2$) | $\left(\frac{O_1}{4}, \frac{O_2}{2}\right)$ |
| 4 | 0-7 | ($O_1$, 2) | $\left(\frac{O_1}{4}, -\right)$ |

In the second embodiment of the present disclosure, a brand-new codebook may be generated using $$v_{m_1} = \sqrt{\frac{Q}{2}} e_{mod(m_1, N_p/2)}^{(N_p/2)}$$

and $u_{m_2} = 1$ as beams for generating codebook assuming configuration 4 and $\delta_1 = 1$ and $p_1 = 1$ in the codebook shown in Tables 18 and 19. Here, $N_p$ denotes the number of antenna ports, and the $e_i^{(N)}$ vector is a vector of N size in which the ith element is 1, and the other elements are 0's.

Table 20 represents the 4Tx codebook generated for each of rank-3 and rank-4 generated based on the codebook shown in Tables 18 and 19. It is assumed in Table 20 below that the brand-new codebook starts from element index 0.

TABLE 20

| Codebook index | Rank-3 codebook | Rank-4 codebook |
|---|---|---|
| 0 | $\begin{bmatrix} e_0 & e_0 & e_1 \\ e_0 & -e_0 & -e_1 \end{bmatrix}$ | $\begin{bmatrix} e_0 & e_1 & e_0 & e_1 \\ e_0 & e_1 & -e_0 & -e_1 \end{bmatrix}$ |
| 1 | $\begin{bmatrix} e_1 & e_0 & e_1 \\ e_1 & -e_0 & -e_1 \end{bmatrix}$ | $\begin{bmatrix} e_0 & e_1 & e_0 & e_1 \\ je_0 & je_1 & -je_0 & -je_1 \end{bmatrix}$ |
| 2 | $\begin{bmatrix} e_0 & e_1 & e_1 \\ e_0 & e_1 & -e_1 \end{bmatrix}$ | — |
| 3 | $\begin{bmatrix} e_1 & e_0 & e_0 \\ e_1 & e_0 & -e_0 \end{bmatrix}$ | — |
| 4 | — | — |
| 5 | — | — |
| 6 | — | — |
| 7 | — | — |

Table 21 represents the 8Tx codebook generated for each of rank-3 and rank-4 generated based on the codebook shown in Tables 18 and 19. It is assumed in Table 21 below that the brand-new codebook starts from element index 0.

TABLE 21

| Codebook index | Rank-3 codebook | Rank-4 codebook |
|---|---|---|
| 0 | $\begin{bmatrix} e_0 & e_0 & e_1 \\ e_0 & -e_0 & -e_1 \end{bmatrix}$ | $\begin{bmatrix} e_0 & e_1 & e_0 & e_1 \\ e_0 & e_1 & -e_0 & -e_1 \end{bmatrix}$ |
| 1 | $\begin{bmatrix} e_1 & e_0 & e_1 \\ e_1 & -e_0 & -e_1 \end{bmatrix}$ | $\begin{bmatrix} e_0 & e_1 & e_0 & e_1 \\ je_0 & je_1 & -je_0 & -je_1 \end{bmatrix}$ |
| 2 | $\begin{bmatrix} e_0 & e_1 & e_1 \\ e_0 & e_1 & -e_1 \end{bmatrix}$ | $\begin{bmatrix} e_1 & e_2 & e_1 & e_2 \\ e_1 & e_2 & -e_1 & -e_2 \end{bmatrix}$ |
| 3 | $\begin{bmatrix} e_1 & e_0 & e_0 \\ e_1 & e_0 & -e_0 \end{bmatrix}$ | $\begin{bmatrix} e_1 & e_2 & e_1 & e_2 \\ je_1 & je_2 & -je_1 & -je_2 \end{bmatrix}$ |
| 4 | $\begin{bmatrix} e_1 & e_1 & e_2 \\ e_1 & -e_1 & -e_2 \end{bmatrix}$ | $\begin{bmatrix} e_2 & e_3 & e_2 & e_3 \\ e_2 & e_3 & -e_2 & -e_3 \end{bmatrix}$ |
| 5 | $\begin{bmatrix} e_2 & e_1 & e_2 \\ e_2 & -e_1 & -e_2 \end{bmatrix}$ | $\begin{bmatrix} e_2 & e_3 & e_2 & e_3 \\ je_2 & je_3 & -je_2 & -je_3 \end{bmatrix}$ |
| 6 | $\begin{bmatrix} e_1 & e_2 & e_2 \\ e_1 & e_2 & -e_2 \end{bmatrix}$ | $\begin{bmatrix} e_3 & e_0 & e_3 & e_0 \\ e_3 & e_0 & -e_0 & -e_0 \end{bmatrix}$ |
| 7 | $\begin{bmatrix} e_2 & e_1 & e_1 \\ e_2 & e_1 & -e_1 \end{bmatrix}$ | $\begin{bmatrix} e_3 & e_0 & e_3 & e_0 \\ je_3 & je_0 & -je_0 & -je_0 \end{bmatrix}$ |
| 8 | $\begin{bmatrix} e_2 & e_2 & e_3 \\ e_2 & -e_2 & -e_3 \end{bmatrix}$ | — |
| 9 | $\begin{bmatrix} e_3 & e_2 & e_3 \\ e_3 & -e_2 & -e_3 \end{bmatrix}$ | — |

TABLE 21-continued

| Codebook index | Rank-3 codebook | Rank-4 codebook |
|---|---|---|
| 10 | $\begin{bmatrix} e_2 & e_3 & e_3 \\ e_2 & e_3 & -e_3 \end{bmatrix}$ | — |
| 11 | $\begin{bmatrix} e_3 & e_2 & e_2 \\ e_3 & e_2 & -e_2 \end{bmatrix}$ | — |
| 12 | $\begin{bmatrix} e_3 & e_2 & e_2 \\ e_3 & e_2 & -e_2 \end{bmatrix}$ | — |
| 13 | $\begin{bmatrix} e_0 & e_3 & e_0 \\ e_0 & -e_3 & -e_0 \end{bmatrix}$ | — |
| 14 | $\begin{bmatrix} e_3 & e_0 & e_0 \\ e_3 & e_0 & -e_0 \end{bmatrix}$ | — |
| 15 | $\begin{bmatrix} e_0 & e_3 & e_3 \\ e_0 & e_3 & -e_3 \end{bmatrix}$ | — |

Other than the rank-3 and rank-4 codebook described above, rank-5, rank-6, rank-7, and rank-8 codebook as shown in Equation 9 below may be used in the future standard.

Equation 9

$$W^{(5)}_{i_{1,1},i_{1,2}} = \frac{1}{\sqrt{5Q}} \begin{bmatrix} v_{s_1 i_{1,1}} \otimes u_{s_2 i_{1,2}} & v_{s_1 i_{1,1}} \otimes u_{s_2 i_{1,2}} & v_{s_1 i_{1,1}+\delta_{1,1}} \otimes u_{s_2 i_{1,2}+\delta_{2,1}} & v_{s_1 i_{1,1}+\delta_{1,1}} \otimes u_{s_2 i_{1,2}+\delta_{2,1}} & v_{s_1 i_{1,1}+\delta_{1,2}} \otimes u_{s_2 i_{1,2}+\delta_{2,2}} \\ v_{s_1 i_{1,1}} \otimes u_{s_2 i_{1,2}} & -v_{s_1 i_{1,1}} \otimes u_{s_2 i_{1,2}} & v_{s_1 i_{1,1}+\delta_{1,1}} \otimes u_{s_2 i_{1,2}+\delta_{2,1}} & -v_{s_1 i_{1,1}+\delta_{1,1}} \otimes u_{s_2 i_{1,2}+\delta_{2,1}} & v_{s_1 i_{1,1}+\delta_{1,2}} \otimes u_{s_2 i_{1,2}+\delta_{2,2}} \end{bmatrix}$$

$$W^{(6)}_{i_{1,1},i_{1,2}} = \frac{1}{\sqrt{6Q}} \begin{bmatrix} v_{s_1 i_{1,1}} \otimes u_{s_2 i_{1,2}} & v_{s_1 i_{1,1}} \otimes u_{s_2 i_{1,2}} & v_{s_1 i_{1,1}+\delta_{1,1}} \otimes u_{s_2 i_{1,2}+\delta_{2,1}} & v_{s_1 i_{1,1}+\delta_{1,1}} \otimes u_{s_2 i_{1,2}+\delta_{2,1}} & v_{s_1 i_{1,1}+\delta_{1,2}} \otimes u_{s_2 i_{1,2}+\delta_{2,2}} & v_{s_1 i_{1,1}+\delta_{1,2}} \otimes u_{s_2 i_{1,2}+\delta_{2,2}} \\ v_{s_1 i_{1,1}} \otimes u_{s_2 i_{1,2}} & -v_{s_1 i_{1,1}} \otimes u_{s_2 i_{1,2}} & v_{s_1 i_{1,1}+\delta_{1,1}} \otimes u_{s_2 i_{1,2}+\delta_{2,1}} & -v_{s_1 i_{1,1}+\delta_{1,1}} \otimes u_{s_2 i_{1,2}+\delta_{2,1}} & v_{s_1 i_{1,1}+\delta_{1,2}} \otimes u_{s_2 i_{1,2}+\delta_{2,2}} & -v_{s_1 i_{1,1}+\delta_{1,2}} \otimes u_{s_2 i_{1,2}+\delta_{2,2}} \end{bmatrix}$$

$$W^{(7)}_{i_{1,1},i_{1,2}} = \frac{1}{\sqrt{7Q}} \begin{bmatrix} v_{s_1 i_{1,1}} \otimes u_{s_2 i_{1,2}} & v_{s_1 i_{1,1}} \otimes u_{s_2 i_{1,2}} & v_{s_1 i_{1,1}+\delta_{1,1}} \otimes u_{s_2 i_{1,2}+\delta_{2,1}} & v_{s_1 i_{1,1}+\delta_{1,1}} \otimes u_{s_2 i_{1,2}+\delta_{2,1}} & v_{s_1 i_{1,1}+\delta_{1,2}} \otimes u_{s_2 i_{1,2}+\delta_{2,2}} & v_{s_1 i_{1,1}+\delta_{1,2}} \otimes u_{s_2 i_{1,2}+\delta_{2,2}} & v_{s_1 i_{1,1}+\delta_{1,3}} \otimes u_{s_2 i_{1,2}+\delta_{2,3}} \\ v_{s_1 i_{1,1}} \otimes u_{s_2 i_{1,2}} & -v_{s_1 i_{1,1}} \otimes u_{s_2 i_{1,2}} & v_{s_1 i_{1,1}+\delta_{1,1}} \otimes u_{s_2 i_{1,2}+\delta_{2,1}} & -v_{s_1 i_{1,1}+\delta_{1,1}} \otimes u_{s_2 i_{1,2}+\delta_{2,1}} & v_{s_1 i_{1,1}+\delta_{1,2}} \otimes u_{s_2 i_{1,2}+\delta_{2,2}} & -v_{s_1 i_{1,1}+\delta_{1,2}} \otimes u_{s_2 i_{1,2}+\delta_{2,2}} & v_{s_1 i_{1,1}+\delta_{1,3}} \otimes u_{s_2 i_{1,2}+\delta_{2,3}} \end{bmatrix}$$

$$W^{(8)}_{i_{1,1},i_{1,2}} = \frac{1}{\sqrt{8Q}} \begin{bmatrix} v_{s_1 i_{1,1}} \otimes u_{s_2 i_{1,2}} & v_{s_1 i_{1,1}} \otimes u_{s_2 i_{1,2}} & v_{s_1 i_{1,1}+\delta_{1,1}} \otimes u_{s_2 i_{1,2}+\delta_{2,1}} & v_{s_1 i_{1,1}+\delta_{1,1}} \otimes u_{s_2 i_{1,2}+\delta_{2,1}} & v_{s_1 i_{1,1}+\delta_{1,2}} \otimes u_{s_2 i_{1,2}+\delta_{2,2}} & v_{s_1 i_{1,1}+\delta_{1,2}} \otimes u_{s_2 i_{1,2}+\delta_{2,2}} & v_{s_1 i_{1,1}+\delta_{1,3}} \otimes u_{s_2 i_{1,2}+\delta_{2,3}} & v_{s_1 i_{1,1}+\delta_{1,3}} \otimes u_{s_2 i_{1,2}+\delta_{2,3}} \\ v_{s_1 i_{1,1}} \otimes u_{s_2 i_{1,2}} & -v_{s_1 i_{1,1}} \otimes u_{s_2 i_{1,2}} & v_{s_1 i_{1,1}+\delta_{1,1}} \otimes u_{s_2 i_{1,2}+\delta_{2,1}} & -v_{s_1 i_{1,1}+\delta_{1,1}} \otimes u_{s_2 i_{1,2}+\delta_{2,1}} & v_{s_1 i_{1,1}+\delta_{1,2}} \otimes u_{s_2 i_{1,2}+\delta_{2,2}} & -v_{s_1 i_{1,1}+\delta_{1,2}} \otimes u_{s_2 i_{1,2}+\delta_{2,2}} & v_{s_1 i_{1,1}+\delta_{1,3}} \otimes u_{s_2 i_{1,2}+\delta_{2,3}} & -v_{s_1 i_{1,1}+\delta_{1,3}} \otimes u_{s_2 i_{1,2}+\delta_{2,3}} \end{bmatrix}$$

Table 22 represents rank-5, rank-6, rank-7, and rank-8 codebook for $\delta_{1,1}$, $\delta_{1,2}$, $\delta_{1,3}$, $\delta_{2,1}$, $\delta_{2,2}$, and $\delta_{2,3}$.

TABLE 22

| $i_2'$ | 0 |
|---|---|
| Precoder | $W_{s_1 i_{1,1}, s_2 i_{1,2}}^{(r)}$ |

An eNB or UE may designate an additional configuration as shown in Tables 23 and 24 based on the codebook shown in Table 22. The codeword of the codebook may be varied according to each configuration.

Table 23 defines $\delta_{1,1}$, $\delta_{1,2}$, $\delta_{1,3}$, $\delta_{2,1}$, $\delta_{2,2}$, and $\delta_{2,3}$ for 16 antenna ports.

TABLE 23

| k | Antenna configuration | $\delta_{1,1}$ | $\delta_{2,1}$ | $\delta_{1,2}$ | $\delta_{2,2}$ | $\delta_{1,3}$ | $\delta_{2,3}$ |
|---|---|---|---|---|---|---|---|
| k = 0 | N1 ≥ N2 | $O_1$ | 0 | $2O_1$ | 0 | $3O_1$ | 0 |
|  | N1 < N2 | 0 | $O_2$ | 0 | $2O_2$ | 0 | $3O_2$ |
| k = 1 | N1 ≥ N2 | $O_1$ | $O_2$ | $2O_1$ | 0 | $3O_1$ | $O_2$ |
|  | N1 < N2 | $O_1$ | $O_2$ | 0 | $2O_2$ | 0 | $3O_2$ |
| k = 2 | Both | $O_1$ | 0 | $O_1$ | $O_2$ | 0 | $O_2$ |

Table 24 defines $\delta_{1,1}$, $\delta_{1,2}$, $\delta_{1,3}$, $\delta_{2,1}$, $\delta_{2,2}$, and $\delta_{2,3}$ for 12 antenna ports.

TABLE 24

| Type | Antenna configuration | $\delta_{1,1}$ | $\delta_{2,1}$ | $\delta_{1,2}$ | $\delta_{2,2}$ | $\delta_{1,3}$ | $\delta_{2,3}$ |
|---|---|---|---|---|---|---|---|
| Orthogonal beam type 0 | N1 ≥ N2 | O1 | 0 | 2O1 | 0 | 0 | O2 |
|  | N1 < N2 | 0 | O2 | 0 | 2O2 | O1 | 0 |
| Orthogonal beam type 1 | N1 ≥ N2 | O1 | 0 | 2O1 | 0 | O1 | O2 |
|  | N1 < N2 | 0 | O2 | 0 | 2O2 | O1 | O2 |
| Orthogonal beam type 2 | Both | O1 | 0 | O1 | O2 | 0 | O2 |

In the second embodiment of the present disclosure, a brand-new codebook may be generated using $$v_{m_1} = \sqrt{\frac{Q}{2}}\, e_{m_1}^{(N_p/2)}$$

and $u_{m_2} = 1$ as beams for generating codebook assuming that $\delta_{1,1}=1$, $\delta_{1,2}=2$, and $\delta_{1,3}=3$ in the codebook shown in Table 22. Here, $N_p$ denotes the number of antenna ports, and the $e_i^{(N)}$ vector is a vector of N size in which the ith element is 1, and the other elements are 0's.

Table 25 represents 8Tx codebook for each of rank-5, rank-6, rank-7, and rank-8 generated based on the codebook shown in Table 22. The codebook for each of rank-5, rank-6, rank-7, and rank-8 in the codebook lacks W2 feedback, and thus, one codeword is used for the codebook. This means that information on PMI need not be fed back when rank-5, rank-6, rank-7, and rank-8 feedbacks are made. It is assumed in Table 25 below that the brand-new codebook starts from element index 0.

TABLE 25

| Codebook index | Rank-5 codebook | Rank-6 codebook |
|---|---|---|
| 0 | $\begin{bmatrix} e_0 & e_0 & e_1 & e_1 & e_2 \\ e_0 & -e_0 & e_1 & -e_1 & e_2 \end{bmatrix}$ | $\begin{bmatrix} e_0 & e_0 & e_1 & e_1 & e_2 & e_2 \\ e_0 & -e_0 & e_1 & -e_1 & e_2 & -e_2 \end{bmatrix}$ |
| 1-15 | — | — |

| Codebook index | Rank-7 codebook | Rank-8 codebook |
|---|---|---|
| 0 | $\begin{bmatrix} e_0 & e_0 & e_1 & e_1 & e_2 & e_2 & e_3 \\ e_0 & -e_0 & e_1 & -e_1 & e_2 & -e_2 & e_3 \end{bmatrix}$ | $\begin{bmatrix} e_0 & e_0 & e_1 & e_1 & e_2 & e_2 & e_3 & e_3 \\ e_0 & -e_0 & e_1 & -e_1 & e_2 & -e_2 & e_3 & -e_3 \end{bmatrix}$ |
| 1-15 | — | — |

Conditions for using the codebook shown in Tables 13, 14, 20, 21, 25 are as follows:

1) When class B of CSI report type applies (e.g., CSI-Reporting-Type='Class B')
2) When only one CSI-RS resource is configured in UE (e.g., only one CSI-RS-ConfigNZPId configuration)
3) When UE is instructed to use the codebook shown in Tables 13,14,20,21,25 (e.g., PMI-Config=1)

Further, the future standard may use rank-5, rank-6, rank-7, and rank-8 codebook as shown in Tables 21 to 24.

Table 26 represents rank-5 codebook when configuration 4 is used. In Table 26, $i_{1,1}$ and $i_{1,2}$ represent W1 codebook index, and $i_2$ represents W2 codebook index.

TABLE 26

| | $i_2$ |
|---|---|
| $i_{1,1}, i_{1,2}$ | 0 |
| $0, 1, \ldots, O_1 N_1 - 1$<br>$0, 1, \ldots, O_2 N_2 - 1$ | $W_{(i_{1,1}, i_{1,2}),(i_{1,1}+O_1, i_{1,2}),(i_{1,1}+2O_1, i_{1,2})}^{(5)}$ |

TABLE 26-continued where
$$W^{(5)}_{(m_1,m_2),(m'_1,m'_2),(m''_1,m''_2)} = \frac{1}{\sqrt{10N_1N_2}} \begin{bmatrix} v_{(m_1,m_2)} & v_{(m_1,m_2)} & v_{(m'_1,m'_2)} & v_{(m'_1,m'_2)} & v_{(m''_1,m''_2)} \\ v_{(m_1,m_2)} & -v_{(m_1,m_2)} & v_{(m'_1,m'_2)} & -v_{(m'_1,m'_2)} & v_{(m''_1,m''_2)} \end{bmatrix}$$

Table 27 represents rank-6 codebook when configuration 4 is used. In Table 20, $i_{1,1}$ and $i_{1,2}$ represent W1 codebook index, and $i_2$ represents W2 codebook index.

TABLE 27

| $i_{1,1}, i_{1,2}$ | $i_2$ |
| --- | --- |
|  | 0 |
| $0, 1, \ldots, O_1N_1 - 1$ $0, 1, \ldots, O_2N_2 - 1$ | $W^{(6)}_{(i_{1,1},i_{1,2}),(i_{1,1}+O_1,i_{1,2}),(i_{1,1}+2O_1,i_{1,2})}$ | where
$$W^{(6)}_{(m_1,m_2),(m'_1,m'_2),(m''_1,m''_2)} = \frac{1}{\sqrt{12N_1N_2}} \begin{bmatrix} v_{(m_1,m_2)} & v_{(m_1,m_2)} & v_{(m'_1,m'_2)} & v_{(m'_1,m'_2)} & v_{(m''_1,m''_2)} & v_{(m''_1,m''_2)} \\ v_{(m_1,m_2)} & -v_{(m_1,m_2)} & v_{(m'_1,m'_2)} & -v_{(m'_1,m'_2)} & v_{(m''_1,m''_2)} & -v_{(m''_1,m''_2)} \end{bmatrix}$$

Table 28 represents rank-7 codebook when configuration 4 is used. In Table 28, $i_{1,1}$ and $i_{1,2}$ represent W1 codebook index, and $i_2$ represents W2 codebook index.

TABLE 28

| $i_{1,1}, i_{1,2}$ | $i_2$ |
| --- | --- |
|  | 0 |
| $0, 1, \ldots, O_1N_1 - 1$ $0, 1, \ldots, O_2N_2 - 1$ | $W^{(7)}_{(i_{1,1},i_{1,2}),(i_{1,1}+O_1,i_{1,2}),(i_{1,1}+2O_1,i_{1,2}),(i_{1,1}+3O_1,i_{1,2})}$ | where
$$W^{(7)}_{(m_1,m_2),(m'_1,m'_2),(m''_1,m''_2),(m'''_1,m'''_2)} = \frac{1}{\left(\sqrt{14N_1N_2}\right)} \begin{bmatrix} v_{(m_1,m_2)} & v_{(m_1,m_2)} & v_{(m'_1,m'_2)} & v_{(m'_1,m'_2)} & v_{(m''_1,m''_2)} & v_{(m''_1,m''_2)} & v_{(m'''_1,m'''_2)} \\ v_{(m_1,m_2)} & -v_{(m_1,m_2)} & v_{(m'_1,m'_2)} & -v_{(m'_1,m'_2)} & v_{(m''_1,m''_2)} & -v_{(m''_1,m''_2)} & v_{(m'''_1,m'''_2)} \end{bmatrix}$$

Table 29 represents rank-8 codebook when configuration 4 is used. In Table 29, $i_{1,1}$ and $i_{1,2}$ represent W1 codebook index, and $i_2$ represents W2 codebook index.

denotes the number of antenna ports, and the $e_i^{(N)}$ vector is a vector of N size in which the ith element is 1, and the other elements are 0's.

TABLE 29

| $i_{1,1}, i_{1,2}$ | $i_2$ |
| --- | --- |
|  | 0 |
| $0, 1, \ldots, O_1N_1 - 1$ $0, 1, \ldots, O_2N_2 - 1$ | $W^{(8)}_{(i_{1,1},i_{1,2}),(i_{1,1}+O_1,i_{1,2}),(i_{1,1}+2O_1,i_{1,2}),(i_{1,1}+3O_1,i_{1,2})}$ | where
$$W^{(8)}_{(m_1,m_2),(m'_1,m'_2),(m''_1,m''_2),(m'''_1,m'''_2)} = \frac{1}{\left(\sqrt{16N_1N_2}\right)} \begin{bmatrix} v_{(m_1,m_2)} & v_{(m_1,m_2)} & v_{(m'_1,m'_2)} & v_{(m'_1,m'_2)} & v_{(m''_1,m''_2)} & v_{(m''_1,m''_2)} & v_{(m'''_1,m'''_2)} & v_{(m'''_1,m'''_2)} \\ v_{(m_1,m_2)} & -v_{(m_1,m_2)} & v_{(m'_1,m'_2)} & -v_{(m'_1,m'_2)} & v_{(m''_1,m''_2)} & -v_{(m''_1,m''_2)} & v_{(m'''_1,m'''_2)} & -v_{(m'''_1,m'''_2)} \end{bmatrix}$$

In the second embodiment of the present disclosure, a brand-new codebook may be generated using $$v_{m_1} = \sqrt{\frac{Q}{2}} e_{m_1}^{(N_p/2)}$$

and $u_{m_2}=1$ as beams for generating codebook assuming O1=1 in the codebook shown in Tables 26 and 29. Here, $N_p$ When $$v_{m_1} = \sqrt{\frac{Q}{2}} e_{m_1}^{(N_p/2)}$$

and $u_{m_2}=1$ are utilized as beams for generating codebook under the assumption that $O_1=1$, an 8Tx codebook for each of rank-5, rank-6, rank-7, and rank-8 as shown in Table 25 may be generated. The codebook for each of rank-5, rank-6, rank-7, and rank-8 in the codebook lacks W2 feedback, and thus, one codeword is used for the codebook. This means that information on PMI need not be fed back when rank-5, rank-6, rank-7, and rank-8 feedbacks are made.

Third Embodiment: Scheme for Generating Feedback Information Other than PMI

According to a third embodiment of the present disclosure, a scheme for generating feedback information other than PMI is described.

In one embodiment, the system may assume the following feedback or may indicate the same to the terminal in order to feedback W1 codebook index.

1) stop UE from performing W1 feedback 2) allow UE to feedback particular W1 index (e.g., feedback "0" as W1 information)

3) in order to instruct the 2) UE operation above, eNB instructs UE to do codebook subset restriction for the operation In another embodiment, in order to feed back a precoding type indicator (PTI), a relevant system may assume the following feedback or instruct UE to do the feedback.

1) stop UE from performing PTI feedback 2) allow UE to feedback particular PTI index (e.g., always feedback "1" as PTI information)

3) in order to instruct the 2) UE operation above, eNB instructs UE to do codebook subset restriction on W1 codebook for the operation. In this case, the W1 codebook available to UE is limited to one value, and resultantly, UE always feeds back "1" as PTI information.

According to an embodiment of the present disclosure, a communication system may use a legacy codebook or a brand-new codebook generated by a brand-new scheme as suggested herein when generating feedback information on downlink reference signal. Accordingly, eNB transmits control information indicating whether the brand-new codebook is used when generating feedback information to UE before transmitting the reference signal to UE. Here, the control information may be designed in the format as shown in Table 30 below.

TABLE 30

| AntennaInfoDedicated-r1x ,,= | SEQUENCE { |
| --- | --- |
| alternativeCodebookEnabled-r1x BOOLEAN or ENUMERATED or BIT STRING | |
| } | |

That is, the control information shown in Table 30 contains a field indicating whether the brand-new codebook is used to generate CSI feedback. When transmitting the control information, UE may use the legacy codebook or brand-new codebook according to the value indicated by the field contained in the control information.

As another example, eNB transmits control information indicating the type of reference signal to UE before transmitting the reference signal. The type of reference signal includes type 1 and type 2, and type 1 denotes that the reference signal is not beamformed, and type 2 denotes that the reference signal is beamformed. Here, the control information may be designed in the format as shown in Table 31 below.

TABLE 31

| NZP-CSI-RS-r1x ,,= | SEQUENCE { |
| --- | --- |
| CSI-RS-Type-r1x | {Class A, Class B} |
| } | |

According to an embodiment of the present disclosure, the brand-new codebook has a high chance of being used in UE receiving BF-CSI-RS. Accordingly, when information on CSI-RS type is delivered to UE as shown in Table 31, UE may determine a codebook to be used for generating CSI feedback based on the CSI-RS type information. That is, when receiving control information containing type 1-related information, UE generates CSI feedback using the legacy codebook, and upon receiving control information including type 2-related information, UE generates CSI feedback using the brand-new codebook.

Figure 3:
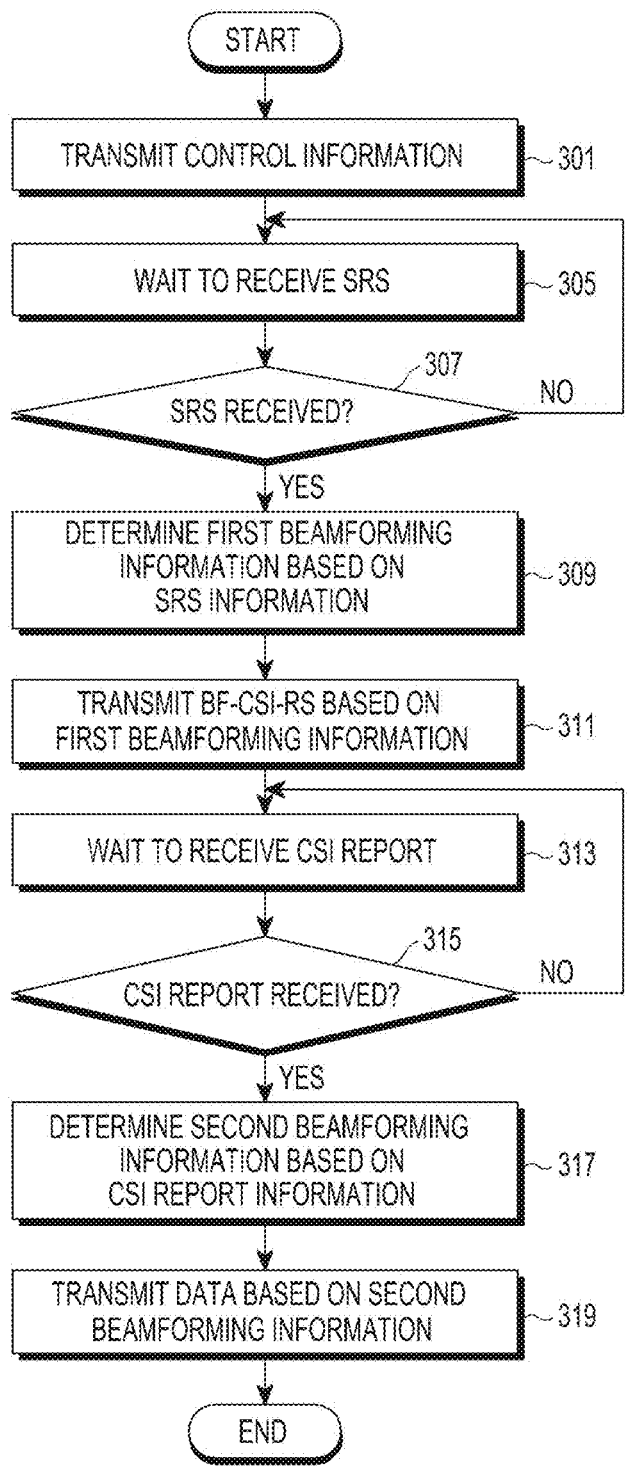
FIG. 3 is a flowchart illustrating an example of operation of a beamformed reference signal by a base station in a communication system according to an embodiment of the present disclosure.

FIG. 3 is a flowchart illustrating an example of operation of a beamformed reference signal by a base station in a communication system according to an embodiment of the present disclosure. Described in connection with FIG. 3 is an operation in which eNB generates first beamforming information using SRS received from UE.

Referring to FIG. 3, in operation 301, eNB transmits, to UE, control information containing a field indicating whether a first codebook is used for generating CSI feedback. Here, the field contained in the control information is assumed to indicate that the first codebook, i.e., a brand-new codebook, is used for generating CSI feedback.

In operation 305, eNB waits to receive SRS periodically transmitted from UE, and eNB goes to operation 307 to determine whether SRS is received. When it is determined in operation 307 that unless SRS is received, eNB goes to operation 305 to wait to receive SRS. When it is determined in operation 307 that SRS is received, eNB goes to operation 309 to determine first beamforming information based on the received SRS information. That is, eNB determines the first beamforming information by performing per-UE precoding on the received SRS information. In operation 311, eNB transmits, to UE, a BF-CSI-RS having beamforming information applied thereto based on the first beamforming information.

In operation 313, eNB waits to receive feedback information on the BF-CSI-RS transmitted in operation 311, e.g., a CSI report, and goes to operation 315 to determine whether the CSI report is received. When the CSI report is not determined to be received, eNB goes to operation 313 to wait to receive the CSI report, and when the CSI report is received, eNB goes to operation 317 to determine second beamforming information based on CSI report information. That is, eNB compensates for RI and CQI based on the CSI report and performs precoding adjustment to determine the second beamforming information.

In operation 319, eNB transmits, to UE, data having beamforming information applied thereto based on the second beamforming information.

Figure 4:
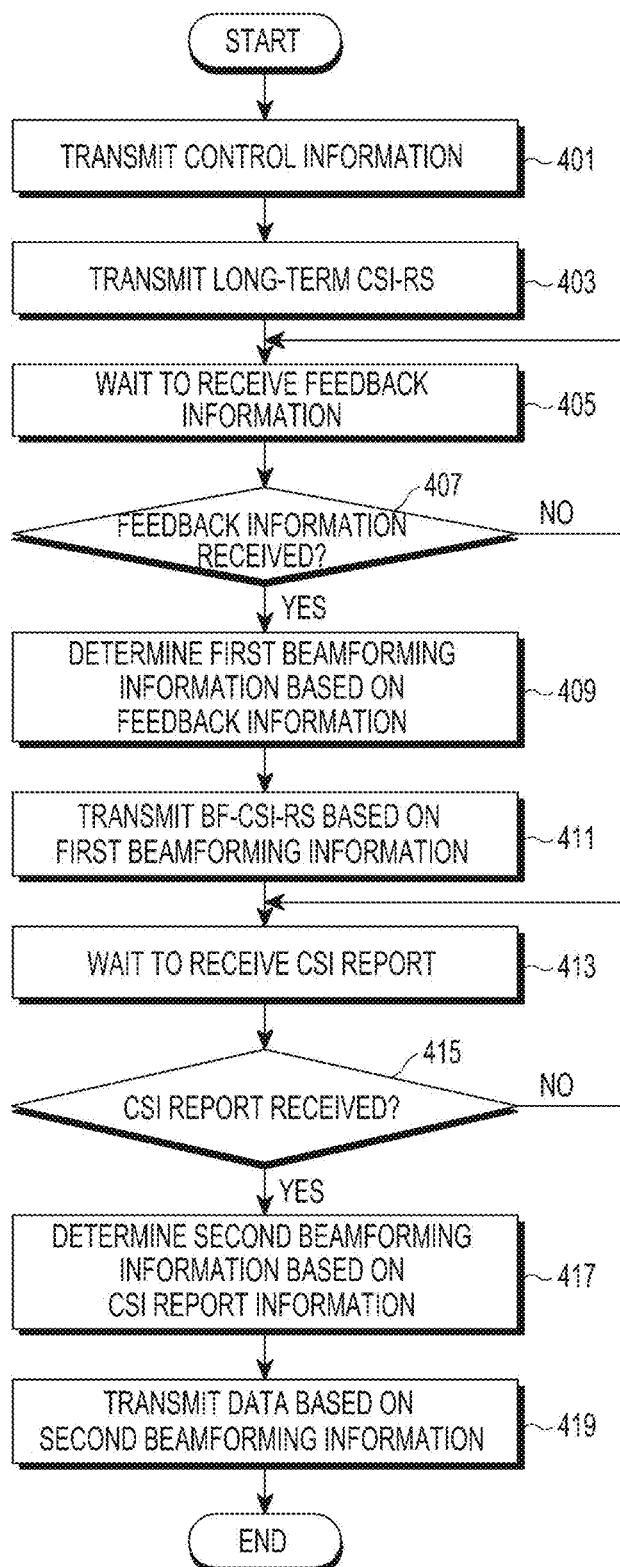
FIG. 4 is a flowchart illustrating an example of operation of a beamformed reference signal by a base station in a communication system according to an embodiment of the present disclosure.

FIG. 4 is a flowchart illustrating an example of operation of a beamformed reference signal by a base station in a communication system according to an embodiment of the present disclosure. Described in connection with FIG. 4 is an operation in which eNB generates first beamforming information using beamforming information received corresponding to a CSI-RS transmitted at a long period.

Referring to FIG. 4, in operation 401, eNB transmits, to UE, control information containing a field indicating whether a first codebook derives CSI feedback and is used for a report for a CSI process. Here, the field contained in the control information is assumed to indicate that the first codebook, i.e., a brand-new codebook, derives the CSI feedback and is used for a report for a CSI process.

In operation 403, eNB transmits a long term CSI-RS transmitted at a long period to UE and goes to operation 405 to wait to receive feedback information transmitted corresponding to the long-term CSI-RS.

In operation 407, eNB determines whether feedback information is received, and when no feedback information is received, eNB goes to operation 405 to wait to receive feedback information. When it is determined in operation 407 that the feedback information is received, eNB goes to operation 409 to determine first beamforming information based on the received feedback information. That is, eNB determines the first beamforming information by performing per-UE precoding on the received feedback information. In operation 411, eNB transmits, to UE, a BF-CSI-RS having beamforming information applied thereto based on the first beamforming information.

In operation 413, eNB waits to receive feedback information on the BF-CSI-RS transmitted in operation 411, e.g., a CSI report, and goes to operation 415 to determine whether the CSI report is received. When the CSI report is not determined to be received, eNB goes to operation 413 to wait to receive the CSI report, and when the CSI report is received, eNB goes to operation 417 to determine second beamforming information based on CSI report information. That is, eNB compensates for RI and CQI based on the CSI report and performs precoding adjustment to determine the second beamforming information.

In operation 419, eNB transmits, to UE, data having beamforming information applied thereto based on the second beamforming information.

Figure 5:
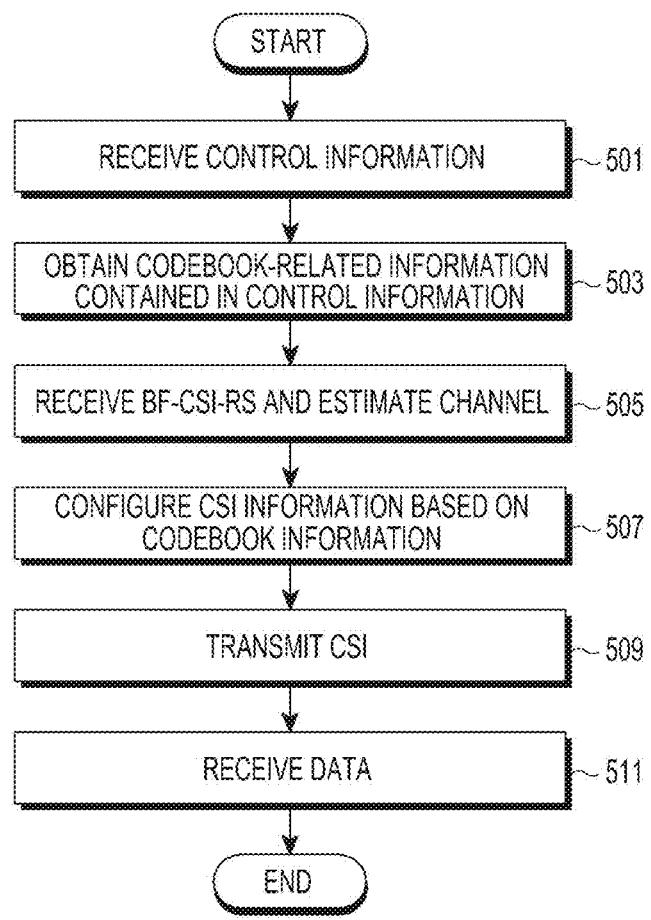
FIG. 5 is a flowchart illustrating an example of operation of a beamformed reference signal by a terminal in a communication system according to an embodiment of the present disclosure.

FIG. 5 is a flowchart illustrating an example of operation of a beamformed reference signal by a terminal in a communication system according to an embodiment of the present disclosure.

Referring to FIG. 5, in operation 501, UE receives, from eNB, control information containing a field indicating whether a first codebook, i.e., brand-new codebook, is used for generating CSI feedback. In operation 503, UE obtains codebook-related information indicated by the field contained in the control information. That is, UE obtains information indicating whether the brand-new codebook is used for generating CSI feedback.

In operation 505, UE receives beamforming information-applied BF-CSI-RS from eNB and estimates channel based on the received BF-CSI-RS.

In operation 507, UE configures feedback information on BF-CSI-RS, e.g., CSI, based on the codebook-related information obtained in operation 503. That is, when the codebook-related information obtained in operation 503 indicates that the brand-new codebook is used for generating CSI feedback, UE configures a CSI based on the brand-new codebook, and when the codebook-related information indicates that the brand-new codebook is not used for generating CSI feedback, UE configures a CSI based on the legacy codebook.

In operation 509, UE transmits the CSI configured in operation 507 to eNB and goes to operation 511 to receive data from eNB.

Figure 6:
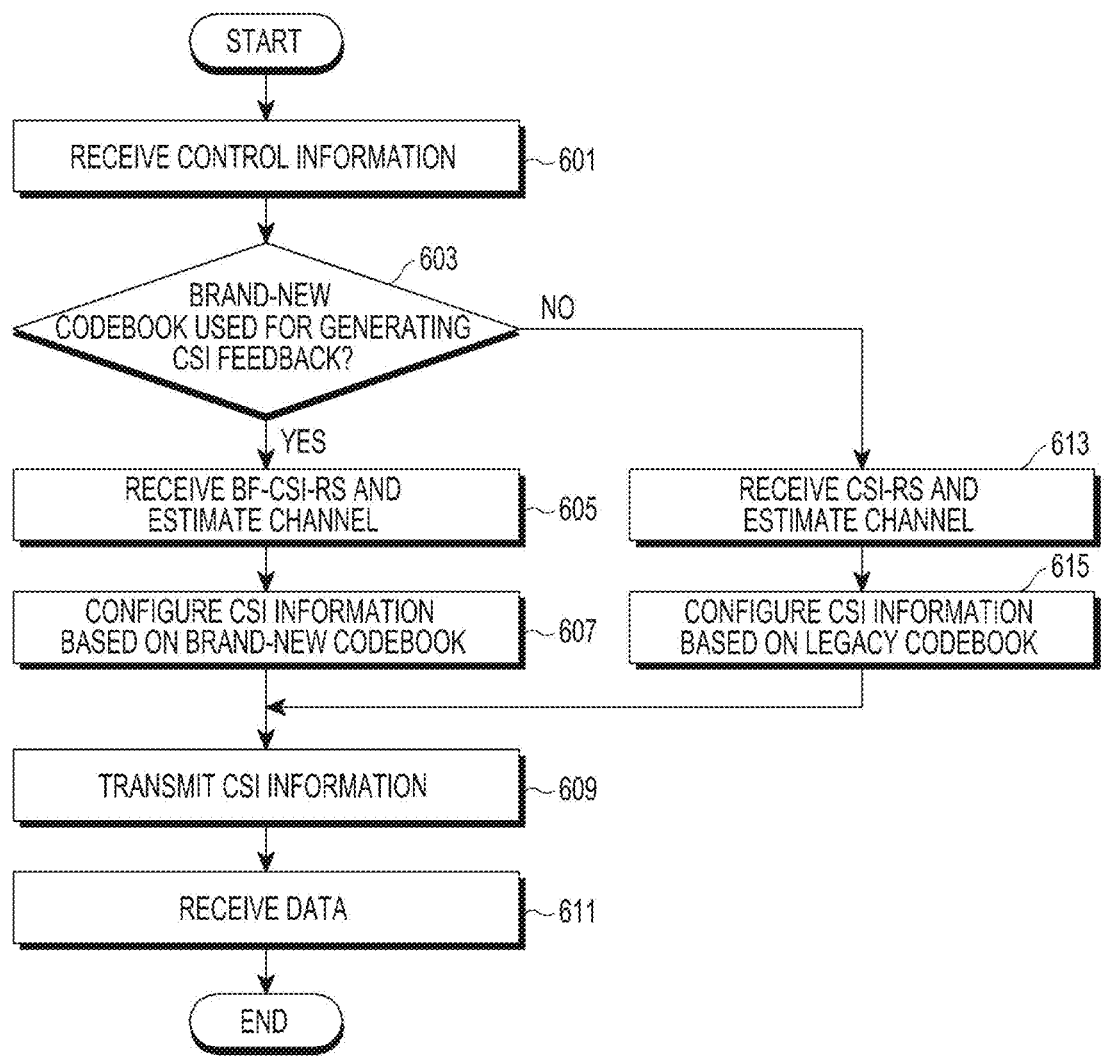
FIG. 6 is a flowchart illustrating an example of operation of a beamformed reference signal by a terminal in a communication system according to an embodiment of the present disclosure.

FIG. 6 is a flowchart illustrating an example of operation of a beamformed reference signal by a terminal in a communication system according to an embodiment of the present disclosure.

Referring to FIG. 6, in operation 601, UE receives, from eNB, control information containing a field indicating whether a first codebook, i.e., brand-new codebook, is used for generating CSI feedback. In operation 603, UE determines whether the brand-new codebook is used for generating CSI feedback based on the field information contained in the control information.

When it is determined in operation 603 that the field contained in the control information indicates that the brand-new codebook is used for generating CSI feedback, UE goes to operation 605 to receive a beamforming information-applied BF-CSI-RS from eNB and estimates channel based on the received BF-CSI-RS.

In operation 607, UE configures feedback information on the BF-CSI-RS, e.g., CSI information, based on the brand-new codebook and goes to operation 609 to transmit the CSI information configured in operation 607.

On the other hand, when it is determined in operation 603 that the field contained in the control information indicates that the brand-new codebook is not used for generating CSI feedback, UE goes to operation 613 to receive a non-beamformed CSI-RS from eNB and estimates channel based on the received CSI-RS. Here, the non-beamformed CSI-RS means non-precoded CSI-RS.

In operation 615, UE configures feedback information on the BF-CSI-RS, e.g., CSI information, based on the legacy codebook and goes to operation 609 to transmit the CSI information configured in operation 615.

Thereafter, in operation 611, UE receives data from eNB.

Figure 7:
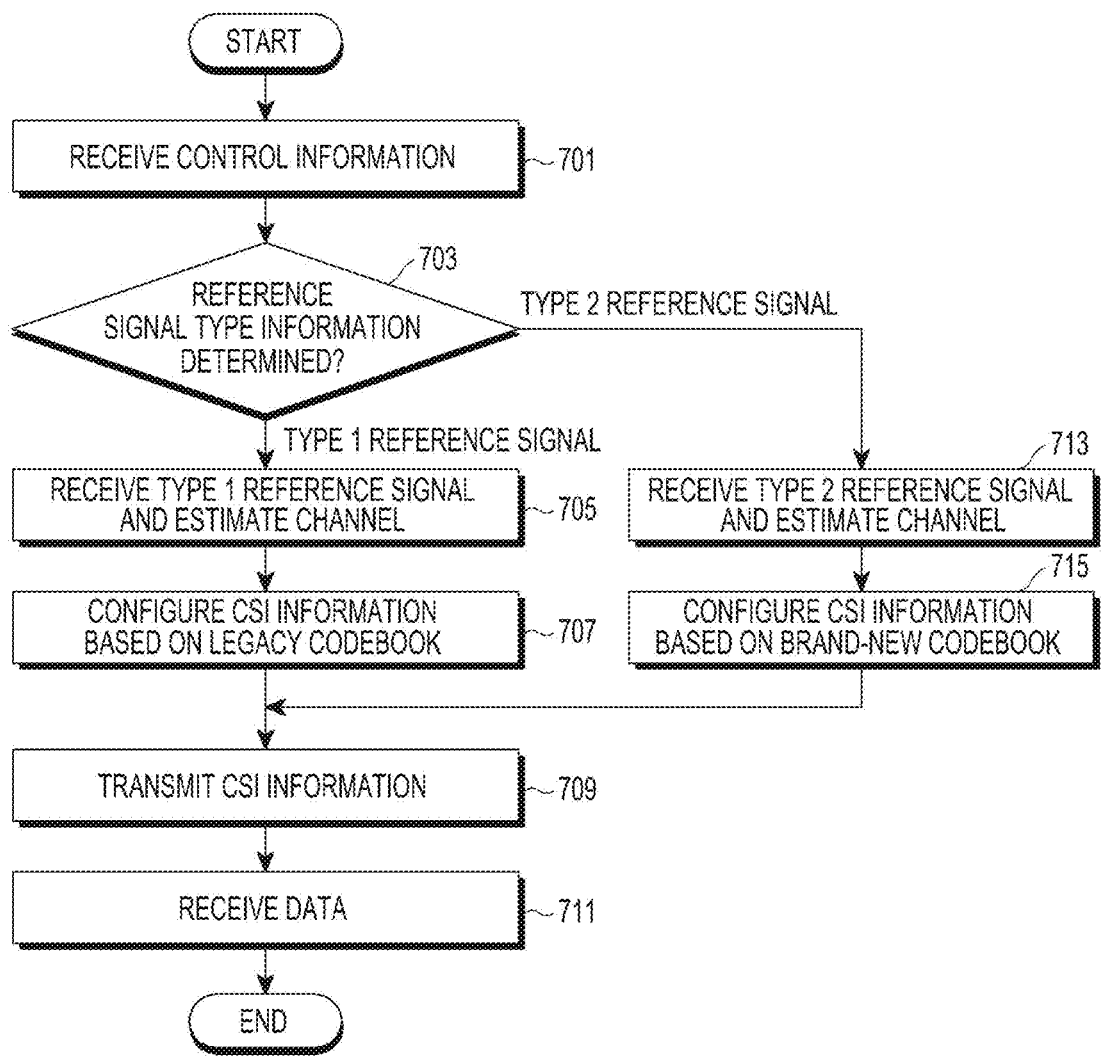
FIG. 7 is a flowchart illustrating an example of operation of a beamformed reference signal by a terminal in a communication system according to an embodiment of the present disclosure.

FIG. 7 is a flowchart illustrating an example of operation of a beamformed reference signal by a terminal in a communication system according to an embodiment of the present disclosure.

Referring to FIG. 7, in operation 701, UE receives control information containing reference signal type information from eNB. Here, reference signal type information includes type 1 information indicating that reference signal is not beamformed and type 2 information indicating that reference signal is beamformed.

In operation 703, UE determines whether control information includes type 1 information or type 2 information, and when the control information includes type 1 information, UE goes to operation 705 to receive a type 1 reference signal, i.e., a non-beamformed reference signal, and estimates channel based on the received reference signal.

In operation 707, UE configures feedback information on the reference signal, e.g., CSI information, based on the legacy codebook and goes to operation 709 to transmit the CSI information configured in operation 707.

On the other hand, when it is determined in operation 703 that the control information includes type 2 information, UE goes to operation 713 to receive a type 2 reference signal, i.e., a beamformed BF-CSI-RS and estimates channel based on the received BF-CSI-RS.

In operation 715, UE configures feedback information on the BF-CSI-RS, e.g., CSI information, based on the brand-new codebook and goes to operation 709 to transmit the CSI information configured in operation 715.

Thereafter, in operation 711, UE receives data from eNB.

Figure 8:
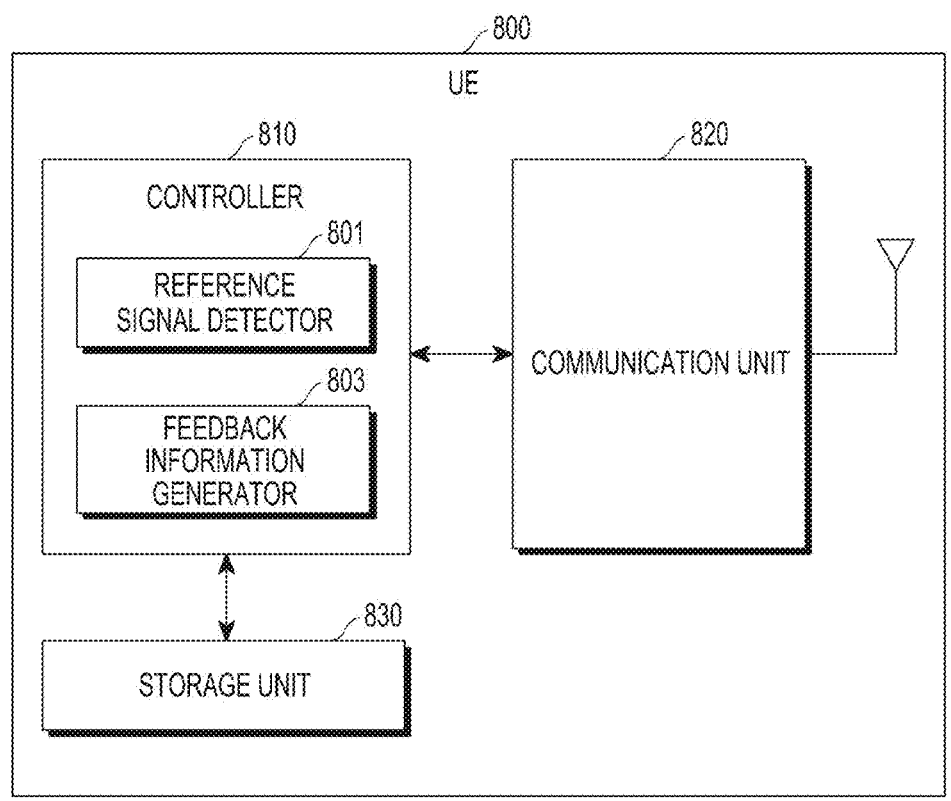
FIG. 8 is a view illustrating an internal configuration of a terminal operating a beamformed reference signal in a communication system according to an embodiment of the present disclosure.

FIG. 8 is a view illustrating an internal configuration of a terminal operating a beamformed reference signal in a communication system according to an embodiment of the present disclosure.

Referring to FIG. 8, a UE 800 as shown includes a controller 810, a communication unit 820, and a storage unit 830, and controller 810 includes a reference signal detector 801 and a feedback information generator 803.

Controller 810 controls the overall operation of UE 800. In particular, controller 810 controls UE 800 to perform the overall operation related to operation of beamformed reference signal according to an embodiment of the present disclosure. Further, reference signal detector 801 in controller 810 detects a reference signal from an eNB, and feedback information generator 803 generates feedback information on the reference signal. Here, the same description given above in connection with FIGS. 1 and 5 to 7 applies to operation of the beamformed reference signal, and no further detailed description is given below.

Communication unit 820 transmits and receives various messages under the control of controller 810. Here, the same description given above in connection with FIGS. 1 and 5 to 7 applies to various messages transmitted/received by communication unit 820, and no further detailed description is given below.

Storage unit 830 stores various information generated from UE 800. Here, the same description given above in connection with FIGS. 1 and 5 to 7 applies to various information stored in storage unit 830, and no further detailed description is given below.

Figure 9:
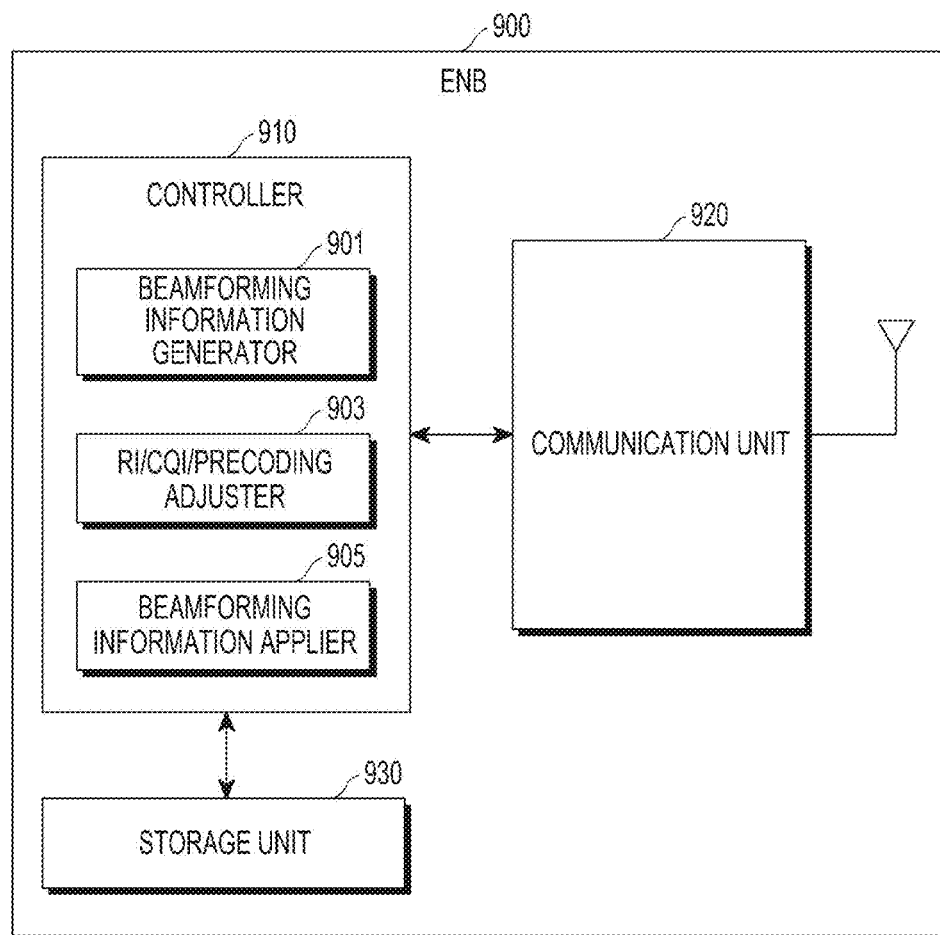
FIG. 9 is a view illustrating an internal configuration of a base station operating a beamformed reference signal in a communication system according to an embodiment of the present disclosure.
Figure 10A:
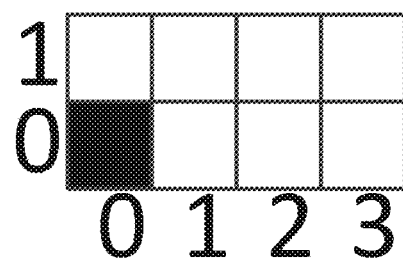
FIGS. 10A, 10B, 10C, and 10D are codebook representations according to an embodiment of the present disclosure.
Figure 10B:
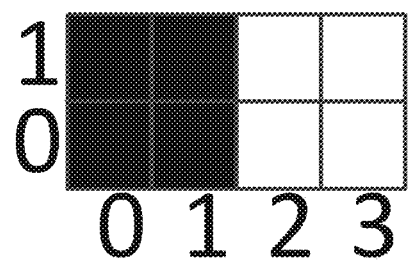
Figure 10C:
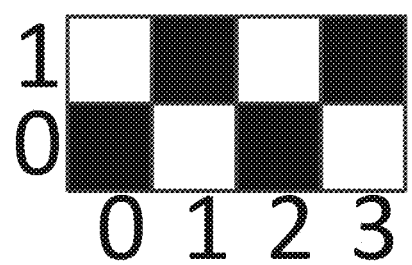
Figure 10D:
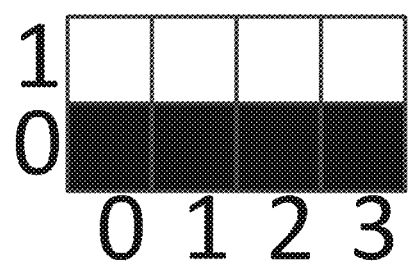

FIG. 9 is a view illustrating an internal configuration of a base station operating a beamformed reference signal in a communication system according to an embodiment of the present disclosure.

Referring to FIG. 9, an eNB 900 as shown includes a controller 910, a communication unit 920, and a storage unit 930, and controller 910 includes a beamforming information generator 901, a RI/CQI/precoding adjuster 903, and a beamforming information applier 905.

Controller 910 controls the overall operation of eNB 900. In particular, controller 910 controls eNB 900 to perform the overall operation related to operation of beamformed reference signal according to an embodiment of the present disclosure. Further, beamforming information generator 901 in controller 910 generates per-UE beamforming information, RI/CQI/precoding adjuster 903 compensates for RI and CQI based on a CSI received from a UE and performs precoding adjustment, and beamforming information applier 905 applies beamforming information to CSI-RS and/or data transmitted to UE. Here, the same description given above in connection with FIGS. 1, 3, and 4 applies to operation of the beamformed reference signal, and no further detailed description is given below.

Communication unit 920 transmits and receives various messages under the control of controller 910. Here, the same description given above in connection with FIGS. 1, 3, and 4 applies to various messages transmitted/received by communication unit 920, and no further detailed description is given below.

Storage unit 930 stores various information generated from eNB 900. Here, the same description given above in connection with FIGS. 1, 3, and 4 applies to various information stored in storage unit 930, and no further detailed description is given below.

Particular aspects of the present disclosure may be implemented in computer-readable codes on a computer-readable recording medium. The computer readable recording medium is a data storage device that may store data readable by a computer system. Examples of the computer readable recording medium may include read only memories (ROMs), random access memories (RAMs), compact disk-read only memories (CD-ROMs), magnetic tapes, floppy disks, optical data storage devices, and carrier waves (such as data transmission over the Internet). The computer readable recording medium may be distributed by computer systems over a network, and accordingly, the computer readable codes may be stored and executed in a distributed manner Functional programs, codes, and code segments to attain the present disclosure may be readily interpreted by skilled programmers in the art to which the present disclosure pertains.

The apparatuses and methods according to various embodiments of the present disclosure may be implemented in hardware, software, or a combination of hardware and software. Such software may be recorded in volatile or non-volatile storage devices, such as ROMs, memories, such as RAMs, memory chips, memory devices, or integrated circuit devices, compact disks (CDs), DVDs, magnetic disks, magnetic tapes, or other optical or magnetic storage devices while retained in machine (e.g., computer)-readable storage media. The methods according to various embodiments of the present disclosure may be implemented by a computer or a portable terminal including a controller and a memory, and the memory may be a machine-readable storage medium that may properly retain program(s) containing instructions for implementing the various embodiments of the present disclosure.

Accordingly, the present disclosure encompasses a program containing codes for implementing the device or method set forth in the claims of this disclosure and a machine (e.g., computer)-readable storage medium storing the program. The program may be electronically transferred via any media such as communication signals transmitted through a wired or wireless connection and the present disclosure properly includes the equivalents thereof.

The apparatuses according to various embodiments of the present disclosure may receive the program from a program providing device wired or wirelessly connected thereto and store the same. The program providing apparatus may include a memory for storing a program including instructions enabling a program processing apparatus to perform a method according to an embodiment of the present disclosure and data necessary for a method according to an embodiment of the present disclosure, a communication unit for performing wired or wireless communication with a graphic processing apparatus, and a controller transmitting the program to the graphic processing apparatus automatically or as requested by the graphic processing apparatus.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method performed by a base station in a wireless communication system, the method comprising:
  transmitting, by the base station, to a terminal, control information including a field, the field indicating whether a first codebook is used for generating feedback information on a beamformed reference signal,
  wherein a second codebook is a legacy codebook for precoding and CSI reporting, and
  wherein the first codebook is an alternative to the second codebook and is generated based on at least one of a number of antenna ports or a number of ranks.

2. The method of claim 1, further comprising:
  receiving, from the terminal, feedback information on the beamformed reference signal generated based on the second codebook considered for generating the first codebook if the field indicates that the first codebook is not used for generating the feedback information.

3. The method of claim 1, wherein the first codebook is represented, if the first codebook is generated based on four antenna ports and rank-1 to rank-4, in the following:

| Codebook index | Rank-1 codebook | Rank-2 codebook | Rank-3 codebook | Rank-4 codebook |
|---|---|---|---|---|
| 0 | $\begin{bmatrix} e_0 \\ e_0 \end{bmatrix}$ | $\begin{bmatrix} e_0 & e_0 \\ e_0 & -e_0 \end{bmatrix}$ | $\begin{bmatrix} e_0 & e_0 & e_1 \\ e_0 & -e_0 & -e_1 \end{bmatrix}$ | $\begin{bmatrix} e_0 & e_1 & e_0 & e_1 \\ e_0 & e_1 & -e_0 & -e_1 \end{bmatrix}$ |
| 1 | $\begin{bmatrix} e_0 \\ -e_0 \end{bmatrix}$ | $\begin{bmatrix} e_0 & e_0 \\ je_0 & -je_0 \end{bmatrix}$ | $\begin{bmatrix} e_1 & e_0 & e_1 \\ e_1 & -e_0 & -e_1 \end{bmatrix}$ | $\begin{bmatrix} e_0 & e_1 & e_0 & e_1 \\ je_0 & je_1 & -je_0 & -je_1 \end{bmatrix}$ |
| 2 | $\begin{bmatrix} e_0 \\ j \cdot e_0 \end{bmatrix}$ | $\begin{bmatrix} e_1 & e_1 \\ e_1 & -e_1 \end{bmatrix}$ | $\begin{bmatrix} e_0 & e_1 & e_1 \\ e_0 & e_1 & -e_1 \end{bmatrix}$ | — |
| 3 | $\begin{bmatrix} e_0 \\ -j \cdot e_0 \end{bmatrix}$ | $\begin{bmatrix} e_1 & e_1 \\ je_1 & -je_1 \end{bmatrix}$ | $\begin{bmatrix} e_1 & e_0 & e_0 \\ e_1 & e_0 & -e_0 \end{bmatrix}$ | — |
| 4 | $\begin{bmatrix} e_1 \\ e_1 \end{bmatrix}$ | $\begin{bmatrix} e_0 & e_1 \\ e_0 & -e_1 \end{bmatrix}$ | — | — |
| 5 | $\begin{bmatrix} e_1 \\ -e_1 \end{bmatrix}$ | $\begin{bmatrix} e_0 & e_1 \\ je_0 & -je_1 \end{bmatrix}$ | — | — |
| 6 | $\begin{bmatrix} e_1 \\ j \cdot e_1 \end{bmatrix}$ | $\begin{bmatrix} e_1 & e_0 \\ e_1 & -e_0 \end{bmatrix}$ | — | — |
| 7 | $\begin{bmatrix} e_1 \\ -j \cdot e_1 \end{bmatrix}$ | $\begin{bmatrix} e_1 & e_0 \\ je_1 & -je_0 \end{bmatrix}$ | — | —. |

4. The method of claim 1, wherein the first codebook is represented, if the first codebook is generated based on eight antenna ports and rank-1 to rank-4, in the following:

| Codebook index | Rank-1 codebook | Rank-2 codebook | Rank-3 codebook | Rank-4 codebook |
|---|---|---|---|---|
| 0 | $\begin{bmatrix} e_0 \\ e_0 \end{bmatrix}$ | $\begin{bmatrix} e_0 & e_0 \\ e_0 & -e_0 \end{bmatrix}$ | $\begin{bmatrix} e_0 & e_0 & e_1 \\ e_0 & -e_0 & -e_1 \end{bmatrix}$ | $\begin{bmatrix} e_0 & e_1 & e_0 & e_1 \\ e_0 & e_1 & -e_0 & -e_1 \end{bmatrix}$ |
| 1 | $\begin{bmatrix} e_0 \\ -e_0 \end{bmatrix}$ | $\begin{bmatrix} e_0 & e_0 \\ je_0 & -je_0 \end{bmatrix}$ | $\begin{bmatrix} e_1 & e_0 & e_1 \\ e_1 & -e_0 & -e_1 \end{bmatrix}$ | $\begin{bmatrix} e_0 & e_1 & e_0 & e_1 \\ je_0 & je_1 & -je_0 & -je_1 \end{bmatrix}$ |
| 2 | $\begin{bmatrix} e_0 \\ j \cdot e_0 \end{bmatrix}$ | $\begin{bmatrix} e_1 & e_1 \\ e_1 & -e_1 \end{bmatrix}$ | $\begin{bmatrix} e_0 & e_1 & e_1 \\ e_0 & e_1 & -e_1 \end{bmatrix}$ | $\begin{bmatrix} e_1 & e_2 & e_1 & e_2 \\ e_1 & e_2 & -e_1 & -e_2 \end{bmatrix}$ |
| 3 | $\begin{bmatrix} e_0 \\ -j \cdot e_0 \end{bmatrix}$ | $\begin{bmatrix} e_1 & e_1 \\ je_1 & -je_1 \end{bmatrix}$ | $\begin{bmatrix} e_1 & e_0 & e_0 \\ e_1 & e_0 & -e_0 \end{bmatrix}$ | $\begin{bmatrix} e_1 & e_2 & e_1 & e_2 \\ je_1 & je_2 & -je_1 & -je_2 \end{bmatrix}$ |
| 4 | $\begin{bmatrix} e_1 \\ e_1 \end{bmatrix}$ | $\begin{bmatrix} e_2 & e_2 \\ e & -e_2 \end{bmatrix}$ | $\begin{bmatrix} e_1 & e_1 & e_2 \\ e_1 & -e_1 & -e_2 \end{bmatrix}$ | $\begin{bmatrix} e_2 & e_3 & e_2 & e_3 \\ e_2 & e_3 & -e_2 & -e_3 \end{bmatrix}$ |
| 5 | $\begin{bmatrix} e_1 \\ -e_1 \end{bmatrix}$ | $\begin{bmatrix} e_2 & e_2 \\ je_2 & -je_2 \end{bmatrix}$ | $\begin{bmatrix} e_2 & e_1 & e_2 \\ e_2 & -e_1 & -e_2 \end{bmatrix}$ | $\begin{bmatrix} e_2 & e_3 & e_2 & e_3 \\ je_2 & je_3 & -je_2 & -je_3 \end{bmatrix}$ |
| 6 | $\begin{bmatrix} e_1 \\ j \cdot e_1 \end{bmatrix}$ | $\begin{bmatrix} e_3 & e_3 \\ e_3 & -e_3 \end{bmatrix}$ | $\begin{bmatrix} e_1 & e_2 & e_2 \\ e_1 & e_2 & -e_2 \end{bmatrix}$ | $\begin{bmatrix} e_3 & e_0 & e_3 & e_0 \\ e_3 & e_0 & -e_0 & -e_0 \end{bmatrix}$ |
| 7 | $\begin{bmatrix} e_1 \\ -j \cdot e_1 \end{bmatrix}$ | $\begin{bmatrix} e_3 & e_3 \\ je_3 & -je_3 \end{bmatrix}$ | $\begin{bmatrix} e_2 & e_1 & e_1 \\ e_2 & e_1 & -e_1 \end{bmatrix}$ | $\begin{bmatrix} e_3 & e_0 & e_3 & e_0 \\ je_3 & je_0 & -je_0 & -je_0 \end{bmatrix}$ |

-continued

| Codebook index | Rank-1 codebook | Rank-2 codebook | Rank-3 codebook | Rank-4 codebook |
|---|---|---|---|---|
| 8 | $\begin{bmatrix} e_2 \\ e_2 \end{bmatrix}$ | $\begin{bmatrix} e_0 & e_1 \\ e_0 & -e_1 \end{bmatrix}$ | $\begin{bmatrix} e_2 & e_2 & e_3 \\ e_2 & -e_2 & -e_3 \end{bmatrix}$ | — |
| 9 | $\begin{bmatrix} e_2 \\ -e_2 \end{bmatrix}$ | $\begin{bmatrix} e_0 & e_1 \\ je_0 & -je_1 \end{bmatrix}$ | $\begin{bmatrix} e_3 & e_2 & e_3 \\ e_3 & -e_2 & -e_3 \end{bmatrix}$ | — |
| 10 | $\begin{bmatrix} e_2 \\ j \cdot e_0 \end{bmatrix}$ | $\begin{bmatrix} e_1 & e_2 \\ e_1 & -e_2 \end{bmatrix}$ | $\begin{bmatrix} e_2 & e_3 & e_3 \\ e_2 & e_3 & -e_3 \end{bmatrix}$ | — |
| 11 | $\begin{bmatrix} e_2 \\ -j \cdot e_2 \end{bmatrix}$ | $\begin{bmatrix} e_1 & e_2 \\ je_1 & -je_2 \end{bmatrix}$ | $\begin{bmatrix} e_3 & e_2 & e_2 \\ e_3 & e_2 & -e_2 \end{bmatrix}$ | — |
| 12 | $\begin{bmatrix} e_3 \\ e_3 \end{bmatrix}$ | $\begin{bmatrix} e_0 & e_3 \\ e_0 & -e_3 \end{bmatrix}$ | $\begin{bmatrix} e_3 & e_2 & e_2 \\ e_3 & e_2 & -e_2 \end{bmatrix}$ | — |
| 13 | $\begin{bmatrix} e_3 \\ -e_3 \end{bmatrix}$ | $\begin{bmatrix} e_0 & e_3 \\ je_0 & -je_3 \end{bmatrix}$ | $\begin{bmatrix} e_0 & e_3 & e_0 \\ e_0 & -e_3 & -e_0 \end{bmatrix}$ | — |
| 14 | $\begin{bmatrix} e_3 \\ j \cdot e_3 \end{bmatrix}$ | $\begin{bmatrix} e_1 & e_3 \\ e_1 & -e_3 \end{bmatrix}$ | $\begin{bmatrix} e_3 & e_0 & e_0 \\ e_3 & e_0 & -e_0 \end{bmatrix}$ | — |
| 15 | $\begin{bmatrix} e_3 \\ -j \cdot e_3 \end{bmatrix}$ | $\begin{bmatrix} e_1 & e_3 \\ je_1 & -je_3 \end{bmatrix}$ | $\begin{bmatrix} e_0 & e_3 & e_3 \\ e_0 & e_3 & -e_3 \end{bmatrix}$ | —. |

5. The method of claim 1, wherein the first codebook is represented, if the first codebook is generated based on eight antenna ports and rank-5 to rank-8, in the following:

| Codebook index | Rank-5 codebook | Rank-6 codebook |
|---|---|---|
| 0 | $\begin{bmatrix} e_0 & e_0 & e_1 & e_1 & e_2 \\ e_0 & -e_0 & e_1 & -e_1 & e_2 \end{bmatrix}$ | $\begin{bmatrix} e_0 & e_0 & e_1 & e_1 & e_2 & e_2 \\ e_0 & -e_0 & e_1 & -e_1 & e_2 & -e_2 \end{bmatrix}$ |
| 1-15 | — | — |

| Codebook index | Rank-7 codebook | Rank-8 codebook |
|---|---|---|
| 0 | $\begin{bmatrix} e_0 & e_0 & e_1 & e_1 & e_2 & e_2 & e_3 \\ e_0 & -e_0 & e_1 & -e_1 & e_2 & -e_2 & e_3 \end{bmatrix}$ | $\begin{bmatrix} e_0 & e_0 & e_1 & e_1 & e_2 & e_2 & e_3 & e_3 \\ e_0 & -e_0 & e_1 & -e_1 & e_2 & -e_2 & e_3 & -e_3 \end{bmatrix}$ |
| 1-15 | — | —. |

6. A method performed by a terminal in a wireless communication system, the method comprising:
  receiving, by the terminal, from a base station, control information including a field, the field indicating whether a first codebook is used for generating feedback information on a beamformed reference signal,
  wherein a second codebook is a legacy codebook for precoding and CSI reporting, and
  wherein the first codebook is an alternative to the second codebook and is generated based on at least one of a number of antenna ports or a number of ranks.

7. The method of claim 6, further comprising:
  transmitting, to the base station, feedback information on the beamformed reference signal generated based on the second codebook considered for generating the first codebook if the field indicates that the first codebook is not used for generating the feedback information.

8. The method of claim 6, wherein the first codebook is represented, if the first codebook is generated based on four antenna ports and rank-1 to rank-4, in the following:

| Codebook index | Rank-1 codebook | Rank-2 codebook | Rank-3 codebook | Rank-4 codebook |
| --- | --- | --- | --- | --- |
| 0 | $\begin{bmatrix} e_0 \\ e_0 \end{bmatrix}$ | $\begin{bmatrix} e_0 & e_0 \\ e_0 & -e_0 \end{bmatrix}$ | $\begin{bmatrix} e_0 & e_0 & e_1 \\ e_0 & -e_0 & -e_1 \end{bmatrix}$ | $\begin{bmatrix} e_0 & e_1 & e_0 & e_1 \\ e_0 & e_1 & -e_0 & -e_1 \end{bmatrix}$ |
| 1 | $\begin{bmatrix} e_0 \\ -e_0 \end{bmatrix}$ | $\begin{bmatrix} e_0 & e_0 \\ je_0 & -je_0 \end{bmatrix}$ | $\begin{bmatrix} e_1 & e_0 & e_1 \\ e_1 & -e_0 & -e_1 \end{bmatrix}$ | $\begin{bmatrix} e_0 & e_1 & e_0 & e_1 \\ je_0 & je_1 & -je_0 & -je_1 \end{bmatrix}$ |
| 2 | $\begin{bmatrix} e_0 \\ j \cdot e_0 \end{bmatrix}$ | $\begin{bmatrix} e_1 & e_1 \\ e_1 & -e_1 \end{bmatrix}$ | $\begin{bmatrix} e_0 & e_1 & e_1 \\ e_0 & e_1 & -e_1 \end{bmatrix}$ | — |
| 3 | $\begin{bmatrix} e_0 \\ -j \cdot e_0 \end{bmatrix}$ | $\begin{bmatrix} e_1 & e_1 \\ je_1 & -je_1 \end{bmatrix}$ | $\begin{bmatrix} e_1 & e_0 & e_0 \\ e_1 & e_0 & -e_0 \end{bmatrix}$ | — |
| 4 | $\begin{bmatrix} e_1 \\ e_1 \end{bmatrix}$ | $\begin{bmatrix} e_0 & e_1 \\ e_0 & -e_1 \end{bmatrix}$ | — | — |
| 5 | $\begin{bmatrix} e_1 \\ -e_1 \end{bmatrix}$ | $\begin{bmatrix} e_0 & e_1 \\ je_0 & -je_1 \end{bmatrix}$ | — | — |
| 6 | $\begin{bmatrix} e_1 \\ j \cdot e_1 \end{bmatrix}$ | $\begin{bmatrix} e_1 & e_0 \\ e_1 & -e_0 \end{bmatrix}$ | — | — |
| 7 | $\begin{bmatrix} e_1 \\ -j \cdot e_1 \end{bmatrix}$ | $\begin{bmatrix} e_1 & e_0 \\ je_1 & -je_0 \end{bmatrix}$ | — | —. |

9. The method of claim 6, wherein the first codebook is represented, if the first codebook is generated based on eight antenna ports and rank-1 to rank-4, in the following:

| Codebook index | Rank-1 codebook | Rank-2 codebook | Rank-3 codebook | Rank-4 codebook |
| --- | --- | --- | --- | --- |
| 0 | $\begin{bmatrix} e_0 \\ e_0 \end{bmatrix}$ | $\begin{bmatrix} e_0 & e_0 \\ e_0 & -e_0 \end{bmatrix}$ | $\begin{bmatrix} e_0 & e_0 & e_1 \\ e_0 & -e_0 & -e_1 \end{bmatrix}$ | $\begin{bmatrix} e_0 & e_1 & e_0 & e_1 \\ e_0 & e_1 & -e_0 & -e_1 \end{bmatrix}$ |
| 1 | $\begin{bmatrix} e_0 \\ -e_0 \end{bmatrix}$ | $\begin{bmatrix} e_0 & e_0 \\ je_0 & -je_0 \end{bmatrix}$ | $\begin{bmatrix} e_1 & e_0 & e_1 \\ e_1 & -e_0 & -e_1 \end{bmatrix}$ | $\begin{bmatrix} e_0 & e_1 & e_0 & e_1 \\ je_0 & je_1 & -je_0 & -je_1 \end{bmatrix}$ |
| 2 | $\begin{bmatrix} e_0 \\ j \cdot e_0 \end{bmatrix}$ | $\begin{bmatrix} e_1 & e_1 \\ e_1 & -e_1 \end{bmatrix}$ | $\begin{bmatrix} e_0 & e_1 & e_1 \\ e_0 & e_1 & -e_1 \end{bmatrix}$ | $\begin{bmatrix} e_1 & e_2 & e_1 & e_2 \\ e_1 & e_2 & -e_1 & -e_2 \end{bmatrix}$ |
| 3 | $\begin{bmatrix} e_0 \\ -j \cdot e_0 \end{bmatrix}$ | $\begin{bmatrix} e_1 & e_1 \\ je_1 & -je_1 \end{bmatrix}$ | $\begin{bmatrix} e_1 & e_0 & e_0 \\ e_1 & e_0 & -e_0 \end{bmatrix}$ | $\begin{bmatrix} e_1 & e_2 & e_1 & e_2 \\ je_1 & je_2 & -je_1 & -je_2 \end{bmatrix}$ |
| 4 | $\begin{bmatrix} e_1 \\ e_1 \end{bmatrix}$ | $\begin{bmatrix} e_2 & e_2 \\ e & -e_2 \end{bmatrix}$ | $\begin{bmatrix} e_1 & e_1 & e_2 \\ e_1 & -e_1 & -e_2 \end{bmatrix}$ | $\begin{bmatrix} e_2 & e_3 & e_2 & e_3 \\ e_2 & e_3 & -e_2 & -e_3 \end{bmatrix}$ |
| 5 | $\begin{bmatrix} e_1 \\ -e_1 \end{bmatrix}$ | $\begin{bmatrix} e_2 & e_2 \\ je_2 & -je_2 \end{bmatrix}$ | $\begin{bmatrix} e_2 & e_1 & e_2 \\ e_2 & -e_1 & -e_2 \end{bmatrix}$ | $\begin{bmatrix} e_2 & e_3 & e_2 & e_3 \\ je_2 & je_3 & -je_2 & -je_3 \end{bmatrix}$ |
| 6 | $\begin{bmatrix} e_1 \\ j \cdot e_1 \end{bmatrix}$ | $\begin{bmatrix} e_3 & e_3 \\ e_3 & -e_3 \end{bmatrix}$ | $\begin{bmatrix} e_1 & e_2 & e_2 \\ e_1 & e_2 & -e_2 \end{bmatrix}$ | $\begin{bmatrix} e_3 & e_0 & e_3 & e_0 \\ e_3 & e_0 & -e_0 & -e_0 \end{bmatrix}$ |
| 7 | $\begin{bmatrix} e_1 \\ -j \cdot e_1 \end{bmatrix}$ | $\begin{bmatrix} e_3 & e_3 \\ je_3 & -je_3 \end{bmatrix}$ | $\begin{bmatrix} e_2 & e_1 & e_1 \\ e_2 & e_1 & -e_1 \end{bmatrix}$ | $\begin{bmatrix} e_3 & e_0 & e_3 & e_0 \\ je_3 & je_0 & -je_0 & -je_0 \end{bmatrix}$ |
| 8 | $\begin{bmatrix} e_2 \\ e_2 \end{bmatrix}$ | $\begin{bmatrix} e_0 & e_1 \\ e_0 & -e_1 \end{bmatrix}$ | $\begin{bmatrix} e_2 & e_2 & e_3 \\ e_2 & -e_2 & -e_3 \end{bmatrix}$ | — |

-continued

| Codebook index | Rank-1 codebook | Rank-2 codebook | Rank-3 codebook | Rank-4 codebook |
|---|---|---|---|---|
| 9 | $\begin{bmatrix} e_2 \\ -e_2 \end{bmatrix}$ | $\begin{bmatrix} e_0 & e_1 \\ je_0 & -je_1 \end{bmatrix}$ | $\begin{bmatrix} e_3 & e_2 & e_3 \\ e_3 & -e_2 & -e_3 \end{bmatrix}$ | — |
| 10 | $\begin{bmatrix} e_2 \\ j \cdot e_0 \end{bmatrix}$ | $\begin{bmatrix} e_1 & e_2 \\ e_1 & -e_2 \end{bmatrix}$ | $\begin{bmatrix} e_2 & e_3 & e_3 \\ e_2 & e_3 & -e_3 \end{bmatrix}$ | — |
| 11 | $\begin{bmatrix} e_2 \\ -j \cdot e_2 \end{bmatrix}$ | $\begin{bmatrix} e_1 & e_2 \\ je_1 & -je_2 \end{bmatrix}$ | $\begin{bmatrix} e_3 & e_2 & e_2 \\ e_3 & e_2 & -e_2 \end{bmatrix}$ | — |
| 12 | $\begin{bmatrix} e_3 \\ e_3 \end{bmatrix}$ | $\begin{bmatrix} e_0 & e_3 \\ e_0 & -e_3 \end{bmatrix}$ | $\begin{bmatrix} e_3 & e_2 & e_2 \\ e_3 & e_2 & -e_2 \end{bmatrix}$ | — |
| 13 | $\begin{bmatrix} e_3 \\ -e_3 \end{bmatrix}$ | $\begin{bmatrix} e_0 & e_3 \\ je_0 & -je_3 \end{bmatrix}$ | $\begin{bmatrix} e_0 & e_3 & e_0 \\ e_0 & -e_3 & -e_0 \end{bmatrix}$ | — |
| 14 | $\begin{bmatrix} e_3 \\ j \cdot e_3 \end{bmatrix}$ | $\begin{bmatrix} e_1 & e_3 \\ e_1 & -e_3 \end{bmatrix}$ | $\begin{bmatrix} e_3 & e_0 & e_0 \\ e_3 & e_0 & -e_0 \end{bmatrix}$ | — |
| 15 | $\begin{bmatrix} e_3 \\ -j \cdot e_3 \end{bmatrix}$ | $\begin{bmatrix} e_1 & e_3 \\ je_1 & -je_3 \end{bmatrix}$ | $\begin{bmatrix} e_0 & e_3 & e_3 \\ e_0 & e_3 & -e_3 \end{bmatrix}$ | —. |

10. The method of claim 6, wherein the first codebook is represented, if the first codebook is generated based on eight antenna ports and rank-5 to rank-8, represented in the following:

| Codebook index | Rank-5 codebook | Rank-6 codebook |
|---|---|---|
| 0 | $\begin{bmatrix} e_0 & e_0 & e_1 & e_1 & e_2 \\ e_0 & -e_0 & e_1 & -e_1 & e_2 \end{bmatrix}$ | $\begin{bmatrix} e_0 & e_0 & e_1 & e_1 & e_2 & e_2 \\ e_0 & -e_0 & e_1 & -e_1 & e_2 & -e_2 \end{bmatrix}$ |
| 1-15 | — | — |

| Codebook Index | Rank-7 codebook | Rank-8 codebook |
|---|---|---|
| 0 | $\begin{bmatrix} e_0 & e_0 & e_1 & e_1 & e_2 & e_2 & e_3 \\ e_0 & -e_0 & e_1 & -e_1 & e_2 & -e_2 & e_3 \end{bmatrix}$ | $\begin{bmatrix} e_0 & e_0 & e_1 & e_1 & e_2 & e_2 & e_3 & e_3 \\ e_0 & -e_0 & e_1 & -e_1 & e_2 & -e_2 & e_3 & -e_3 \end{bmatrix}$ |
| 1-15 | — | —. |

11. A terminal performed in a wireless communication system, the terminal comprising:

a transceiver configured to transmit and receive a relevant signal; and at least one processor configured to receive, from a base station, control information including a field, the field indicating whether a first codebook is used for generating feedback information on a beamformed reference signal, wherein a second codebook is a legacy codebook for precoding and CSI reporting, and wherein the first codebook is an alternative to the second codebook and is generated based on at least one of a number of antenna ports or a number of ranks.

12. The terminal of claim 11, wherein the at least one processor is further configured to:

transmit, to the base station, feedback information on the beamformed reference signal generated based on the second codebook considered for generating the first codebook if the field indicates that the first codebook is not used for generating the feedback information.

13. The terminal of claim 11, wherein the first codebook is represented, if the first codebook is generated based on four antenna ports and rank-1 to rank-4, in the following:

| Codebook index | Rank-1 codebook | Rank-2 codebook | Rank-3 codebook | Rank-4 codebook |
|---|---|---|---|---|
| 0 | $\begin{bmatrix} e_0 \\ e_0 \end{bmatrix}$ | $\begin{bmatrix} e_0 & e_0 \\ e_0 & -e_0 \end{bmatrix}$ | $\begin{bmatrix} e_0 & e_0 & e_1 \\ e_0 & -e_0 & -e_1 \end{bmatrix}$ | $\begin{bmatrix} e_0 & e_1 & e_0 & e_1 \\ e_0 & e_1 & -e_0 & -e_1 \end{bmatrix}$ |
| 1 | $\begin{bmatrix} e_0 \\ -e_0 \end{bmatrix}$ | $\begin{bmatrix} e_0 & e_0 \\ je_0 & -je_0 \end{bmatrix}$ | $\begin{bmatrix} e_1 & e_0 & e_1 \\ e_1 & -e_0 & -e_1 \end{bmatrix}$ | $\begin{bmatrix} e_0 & e_1 & e_0 & e_1 \\ je_0 & je_1 & -je_0 & -je_1 \end{bmatrix}$ |
| 2 | $\begin{bmatrix} e_0 \\ j \cdot e_0 \end{bmatrix}$ | $\begin{bmatrix} e_1 & e_1 \\ e_1 & -e_1 \end{bmatrix}$ | $\begin{bmatrix} e_0 & e_1 & e_1 \\ e_0 & e_1 & -e_1 \end{bmatrix}$ | — |
| 3 | $\begin{bmatrix} e_0 \\ -j \cdot e_0 \end{bmatrix}$ | $\begin{bmatrix} e_1 & e_1 \\ je_1 & -je_1 \end{bmatrix}$ | $\begin{bmatrix} e_1 & e_0 & e_0 \\ e_1 & e_0 & -e_0 \end{bmatrix}$ | — |
| 4 | $\begin{bmatrix} e_1 \\ e_1 \end{bmatrix}$ | $\begin{bmatrix} e_0 & e_1 \\ e_0 & -e_1 \end{bmatrix}$ | — | — |
| 5 | $\begin{bmatrix} e_1 \\ -e_1 \end{bmatrix}$ | $\begin{bmatrix} e_0 & e_1 \\ je_0 & -je_1 \end{bmatrix}$ | — | — |
| 6 | $\begin{bmatrix} e_1 \\ j \cdot e_1 \end{bmatrix}$ | $\begin{bmatrix} e_1 & e_0 \\ e_1 & -e_0 \end{bmatrix}$ | — | — |
| 7 | $\begin{bmatrix} e_1 \\ -j \cdot e_1 \end{bmatrix}$ | $\begin{bmatrix} e_1 & e_0 \\ je_1 & -je_0 \end{bmatrix}$ | — | —. |

14. The terminal of claim 11, wherein the first codebook is represented, if the first codebook is generated based on eight antenna ports and rank-1 to rank-4, in the following:

| Codebook index | Rank-1 codebook | Rank-2 codebook | Rank-3 codebook | Rank-4 codebook |
|---|---|---|---|---|
| 0 | $\begin{bmatrix} e_0 \\ e_0 \end{bmatrix}$ | $\begin{bmatrix} e_0 & e_0 \\ e_0 & -e_0 \end{bmatrix}$ | $\begin{bmatrix} e_0 & e_0 & e_1 \\ e_0 & -e_0 & -e_1 \end{bmatrix}$ | $\begin{bmatrix} e_0 & e_1 & e_0 & e_1 \\ e_0 & e_1 & -e_0 & -e_1 \end{bmatrix}$ |
| 1 | $\begin{bmatrix} e_0 \\ -e_0 \end{bmatrix}$ | $\begin{bmatrix} e_0 & e_0 \\ je_0 & -je_0 \end{bmatrix}$ | $\begin{bmatrix} e_1 & e_0 & e_1 \\ e_1 & -e_0 & -e_1 \end{bmatrix}$ | $\begin{bmatrix} e_0 & e_1 & e_0 & e_1 \\ je_0 & je_1 & -je_0 & -je_1 \end{bmatrix}$ |
| 2 | $\begin{bmatrix} e_0 \\ j \cdot e_0 \end{bmatrix}$ | $\begin{bmatrix} e_1 & e_1 \\ e_1 & -e_1 \end{bmatrix}$ | $\begin{bmatrix} e_0 & e_1 & e_1 \\ e_0 & e_1 & -e_1 \end{bmatrix}$ | $\begin{bmatrix} e_1 & e_2 & e_1 & e_2 \\ e_1 & e_2 & -e_1 & -e_2 \end{bmatrix}$ |
| 3 | $\begin{bmatrix} e_0 \\ -j \cdot e_0 \end{bmatrix}$ | $\begin{bmatrix} e_1 & e_1 \\ je_1 & -je_1 \end{bmatrix}$ | $\begin{bmatrix} e_1 & e_0 & e_0 \\ e_1 & e_0 & -e_0 \end{bmatrix}$ | $\begin{bmatrix} e_1 & e_2 & e_1 & e_2 \\ je_1 & je_2 & -je_1 & -je_2 \end{bmatrix}$ |
| 4 | $\begin{bmatrix} e_1 \\ e_1 \end{bmatrix}$ | $\begin{bmatrix} e_2 & e_2 \\ e & -e_2 \end{bmatrix}$ | $\begin{bmatrix} e_1 & e_1 & e_2 \\ e_1 & -e_1 & -e_2 \end{bmatrix}$ | $\begin{bmatrix} e_2 & e_3 & e_2 & e_3 \\ e_2 & e_3 & -e_2 & -e_3 \end{bmatrix}$ |
| 5 | $\begin{bmatrix} e_1 \\ -e_1 \end{bmatrix}$ | $\begin{bmatrix} e_2 & e_2 \\ je & -je_2 \end{bmatrix}$ | $\begin{bmatrix} e_2 & e_1 & e_2 \\ e_2 & -e_1 & -e_2 \end{bmatrix}$ | $\begin{bmatrix} e_2 & e_3 & e_2 & e_3 \\ je_2 & je_3 & -je_2 & -je_3 \end{bmatrix}$ |
| 6 | $\begin{bmatrix} e_1 \\ j \cdot e_1 \end{bmatrix}$ | $\begin{bmatrix} e_3 & e_3 \\ e_3 & -e_3 \end{bmatrix}$ | $\begin{bmatrix} e_1 & e_2 & e_2 \\ e_1 & e_2 & -e_2 \end{bmatrix}$ | $\begin{bmatrix} e_3 & e_0 & e_3 & e_0 \\ e_3 & e_0 & -e_0 & -e_0 \end{bmatrix}$ |
| 7 | $\begin{bmatrix} e_1 \\ -j \cdot e_1 \end{bmatrix}$ | $\begin{bmatrix} e_3 & e_3 \\ je_3 & -je_3 \end{bmatrix}$ | $\begin{bmatrix} e_2 & e_1 & e_1 \\ e_2 & e_1 & -e_1 \end{bmatrix}$ | $\begin{bmatrix} e_3 & e_0 & e_3 & e_0 \\ je_3 & je_0 & -je_0 & -je_0 \end{bmatrix}$ |
| 8 | $\begin{bmatrix} e_2 \\ e_2 \end{bmatrix}$ | $\begin{bmatrix} e_0 & e_1 \\ e_0 & -e_1 \end{bmatrix}$ | $\begin{bmatrix} e_2 & e_2 & e_3 \\ e_2 & -e_2 & -e_3 \end{bmatrix}$ | — |

-continued

| Codebook index | Rank-1 codebook | Rank-2 codebook | Rank-3 codebook | Rank-4 codebook |
|---|---|---|---|---|
| 9 | $\begin{bmatrix} e_2 \\ -e_2 \end{bmatrix}$ | $\begin{bmatrix} e_0 & e_1 \\ je_0 & -je_1 \end{bmatrix}$ | $\begin{bmatrix} e_3 & e_2 & e_3 \\ e_3 & -e_2 & -e_3 \end{bmatrix}$ | — |
| 10 | $\begin{bmatrix} e_2 \\ j \cdot e_0 \end{bmatrix}$ | $\begin{bmatrix} e_1 & e_2 \\ e_1 & -e_2 \end{bmatrix}$ | $\begin{bmatrix} e_2 & e_3 & e_3 \\ e_2 & e_3 & -e_3 \end{bmatrix}$ | — |
| 11 | $\begin{bmatrix} e_2 \\ -j \cdot e_2 \end{bmatrix}$ | $\begin{bmatrix} e_1 & e_2 \\ je_1 & -je_2 \end{bmatrix}$ | $\begin{bmatrix} e_3 & e_2 & e_2 \\ e_3 & e_2 & -e_2 \end{bmatrix}$ | — |
| 12 | $\begin{bmatrix} e_3 \\ e_3 \end{bmatrix}$ | $\begin{bmatrix} e_0 & e_3 \\ e_0 & -e_3 \end{bmatrix}$ | $\begin{bmatrix} e_3 & e_2 & e_2 \\ e_3 & e_2 & -e_2 \end{bmatrix}$ | — |
| 13 | $\begin{bmatrix} e_3 \\ -e_3 \end{bmatrix}$ | $\begin{bmatrix} e_0 & e_3 \\ je_0 & -je_3 \end{bmatrix}$ | $\begin{bmatrix} e_0 & e_3 & e_0 \\ e_0 & -e_3 & -e_0 \end{bmatrix}$ | — |
| 14 | $\begin{bmatrix} e_3 \\ j \cdot e_3 \end{bmatrix}$ | $\begin{bmatrix} e_1 & e_3 \\ e_1 & -e_3 \end{bmatrix}$ | $\begin{bmatrix} e_3 & e_0 & e_0 \\ e_3 & e_0 & -e_0 \end{bmatrix}$ | — |
| 15 | $\begin{bmatrix} e_3 \\ -j \cdot e_3 \end{bmatrix}$ | $\begin{bmatrix} e_1 & e_3 \\ je_1 & -je_3 \end{bmatrix}$ | $\begin{bmatrix} e_0 & e_3 & e_3 \\ e_0 & e_3 & -e_3 \end{bmatrix}$ | —. |

15. The terminal of claim 11, wherein the first codebook is represented, if the first codebook is generated based on eight antenna ports and rank-5 to rank-8, the following:

| Codebook index | Rank-5 codebook | Rank-6 codebook |
|---|---|---|
| 0 | $\begin{bmatrix} e_0 & e_0 & e_1 & e_1 & e_2 \\ e_0 & -e_0 & e_1 & -e_1 & e_2 \end{bmatrix}$ | $\begin{bmatrix} e_0 & e_0 & e_1 & e_1 & e_2 & e_2 \\ e_0 & -e_0 & e_1 & -e_1 & e_2 & -e_2 \end{bmatrix}$ |
| 1-15 | — | — |

| Codebook Index | Rank-7 codebook | Rank-8 codebook |
|---|---|---|
| 0 | $\begin{bmatrix} e_0 & e_0 & e_1 & e_1 & e_2 & e_2 & e_3 \\ e_0 & -e_0 & e_1 & -e_1 & e_2 & -e_2 & e_3 \end{bmatrix}$ | $\begin{bmatrix} e_0 & e_0 & e_1 & e_1 & e_2 & e_2 & e_3 & e_3 \\ e_0 & -e_0 & e_1 & -e_1 & e_2 & -e_2 & e_3 & -e_3 \end{bmatrix}$ |
| 1-15 | — | —. |

16. A base station performed in a wireless communication system, the base station comprising:
a transceiver configured to transmit and receive a relevant signal; and
at least one processor configured to transmit, to a terminal, control information including a field, the field indicating whether a first codebook is used for generating feedback information on a beamformed reference signal,
wherein a second codebook is a legacy codebook for precoding and CSI reporting, and
wherein the first codebook is an alternative to the second codebook and is generated based on at least one of a number of antenna ports or a number of ranks.

17. The base station of claim 16, wherein the at least one processor is further configured to:
receive, from the terminal, feedback information on the beamformed reference signal based on the second codebook considered for generating the first codebook if the field indicates that the first codebook is not used for generating the feedback information.

18. The base station of claim 16, wherein the first codebook is represented, if the first codebook is generated based on four antenna ports and rank-1 to rank-4, in the following:

| Codebook index | Rank-1 codebook | Rank-2 codebook | Rank-3 codebook | Rank-4 codebook |
| --- | --- | --- | --- | --- |
| 0 | $\begin{bmatrix} e_0 \\ e_0 \end{bmatrix}$ | $\begin{bmatrix} e_0 & e_0 \\ e_0 & -e_0 \end{bmatrix}$ | $\begin{bmatrix} e_0 & e_0 & e_1 \\ e_0 & -e_0 & -e_1 \end{bmatrix}$ | $\begin{bmatrix} e_0 & e_1 & e_0 & e_1 \\ e_0 & e_1 & -e_0 & -e_1 \end{bmatrix}$ |
| 1 | $\begin{bmatrix} e_0 \\ -e_0 \end{bmatrix}$ | $\begin{bmatrix} e_0 & e_0 \\ je_0 & -je_0 \end{bmatrix}$ | $\begin{bmatrix} e_1 & e_0 & e_1 \\ e_1 & -e_0 & -e_1 \end{bmatrix}$ | $\begin{bmatrix} e_0 & e_1 & e_0 & e_1 \\ je_0 & je_1 & -je_0 & -je_1 \end{bmatrix}$ |
| 2 | $\begin{bmatrix} e_0 \\ j \cdot e_0 \end{bmatrix}$ | $\begin{bmatrix} e_1 & e_1 \\ e_1 & -e_1 \end{bmatrix}$ | $\begin{bmatrix} e_0 & e_1 & e_1 \\ e_0 & e_1 & -e_1 \end{bmatrix}$ | — |
| 3 | $\begin{bmatrix} e_0 \\ -j \cdot e_0 \end{bmatrix}$ | $\begin{bmatrix} e_1 & e_1 \\ je_1 & -je_1 \end{bmatrix}$ | $\begin{bmatrix} e_1 & e_0 & e_0 \\ e_1 & e_0 & -e_0 \end{bmatrix}$ | — |
| 4 | $\begin{bmatrix} e_1 \\ e_1 \end{bmatrix}$ | $\begin{bmatrix} e_0 & e_1 \\ e_0 & -e_1 \end{bmatrix}$ | — | — |
| 5 | $\begin{bmatrix} e_1 \\ -e_1 \end{bmatrix}$ | $\begin{bmatrix} e_0 & e_1 \\ je_0 & -je_1 \end{bmatrix}$ | — | — |
| 6 | $\begin{bmatrix} e_1 \\ j \cdot e_1 \end{bmatrix}$ | $\begin{bmatrix} e_1 & e_0 \\ e_1 & -e_0 \end{bmatrix}$ | — | — |
| 7 | $\begin{bmatrix} e_1 \\ -j \cdot e_1 \end{bmatrix}$ | $\begin{bmatrix} e_1 & e_0 \\ je_1 & -je_0 \end{bmatrix}$ | — | — |

19. The base station of claim 16, wherein the first codebook is represented, if the first codebook is generated based on eight antenna ports and rank-1 to rank-4, in the following:

| Codebook index | Rank-1 codebook | Rank-2 codebook | Rank-3 codebook | Rank-4 codebook |
| --- | --- | --- | --- | --- |
| 0 | $\begin{bmatrix} e_0 \\ e_0 \end{bmatrix}$ | $\begin{bmatrix} e_0 & e_0 \\ e_0 & -e_0 \end{bmatrix}$ | $\begin{bmatrix} e_0 & e_0 & e_1 \\ e_0 & -e_0 & -e_1 \end{bmatrix}$ | $\begin{bmatrix} e_0 & e_1 & e_0 & e_1 \\ e_0 & e_1 & -e_0 & -e_1 \end{bmatrix}$ |
| 1 | $\begin{bmatrix} e_0 \\ -e_0 \end{bmatrix}$ | $\begin{bmatrix} e_0 & e_0 \\ je_0 & -je_0 \end{bmatrix}$ | $\begin{bmatrix} e_1 & e_0 & e_1 \\ e_1 & -e_0 & -e_1 \end{bmatrix}$ | $\begin{bmatrix} e_0 & e_1 & e_0 & e_1 \\ je_0 & je_1 & -je_0 & -je_1 \end{bmatrix}$ |
| 2 | $\begin{bmatrix} e_0 \\ j \cdot e_0 \end{bmatrix}$ | $\begin{bmatrix} e_1 & e_1 \\ e_1 & -e_1 \end{bmatrix}$ | $\begin{bmatrix} e_0 & e_1 & e_1 \\ e_0 & e_1 & -e_1 \end{bmatrix}$ | $\begin{bmatrix} e_1 & e_2 & e_1 & e_2 \\ e_1 & e_2 & -e_1 & -e_2 \end{bmatrix}$ |
| 3 | $\begin{bmatrix} e_0 \\ -j \cdot e_0 \end{bmatrix}$ | $\begin{bmatrix} e_1 & e_1 \\ je_1 & -je_1 \end{bmatrix}$ | $\begin{bmatrix} e_1 & e_0 & e_0 \\ e_1 & e_0 & -e_0 \end{bmatrix}$ | $\begin{bmatrix} e_1 & e_2 & e_1 & e_2 \\ je_1 & je_2 & -je_1 & -je_2 \end{bmatrix}$ |
| 4 | $\begin{bmatrix} e_1 \\ e_1 \end{bmatrix}$ | $\begin{bmatrix} e_2 & e_2 \\ e & -e_2 \end{bmatrix}$ | $\begin{bmatrix} e_1 & e_1 & e_2 \\ e_1 & -e_1 & -e_2 \end{bmatrix}$ | $\begin{bmatrix} e_2 & e_3 & e_2 & e_3 \\ e_2 & e_3 & -e_2 & -e_3 \end{bmatrix}$ |
| 5 | $\begin{bmatrix} e_1 \\ -e_1 \end{bmatrix}$ | $\begin{bmatrix} e_2 & e_2 \\ je_2 & -je_2 \end{bmatrix}$ | $\begin{bmatrix} e_2 & e_1 & e_2 \\ e_2 & -e_1 & -e_2 \end{bmatrix}$ | $\begin{bmatrix} e_2 & e_3 & e_2 & e_3 \\ je_2 & je_3 & -je_2 & -je_3 \end{bmatrix}$ |
| 6 | $\begin{bmatrix} e_1 \\ j \cdot e_1 \end{bmatrix}$ | $\begin{bmatrix} e_3 & e_3 \\ e_3 & -e_3 \end{bmatrix}$ | $\begin{bmatrix} e_1 & e_2 & e_2 \\ e_1 & e_2 & -e_2 \end{bmatrix}$ | $\begin{bmatrix} e_3 & e_0 & e_3 & e_0 \\ e_3 & e_0 & -e_0 & -e_0 \end{bmatrix}$ |
| 7 | $\begin{bmatrix} e_1 \\ -j \cdot e_1 \end{bmatrix}$ | $\begin{bmatrix} e_3 & e_3 \\ je_3 & -je_3 \end{bmatrix}$ | $\begin{bmatrix} e_2 & e_1 & e_1 \\ e_2 & e_1 & -e_1 \end{bmatrix}$ | $\begin{bmatrix} e_3 & e_0 & e_3 & e_0 \\ je_3 & je_0 & -je_0 & -je_0 \end{bmatrix}$ |
| 8 | $\begin{bmatrix} e_2 \\ e_2 \end{bmatrix}$ | $\begin{bmatrix} e_0 & e_1 \\ e_0 & -e_1 \end{bmatrix}$ | $\begin{bmatrix} e_2 & e_2 & e_3 \\ e_2 & -e_2 & -e_3 \end{bmatrix}$ | — |

| Codebook index | Rank-1 codebook | Rank-2 codebook | Rank-3 codebook | Rank-4 codebook |
|---|---|---|---|---|
| 9 | $\begin{bmatrix} e_2 \\ -e_2 \end{bmatrix}$ | $\begin{bmatrix} e_0 & e_1 \\ je_0 & -je_1 \end{bmatrix}$ | $\begin{bmatrix} e_3 & e_2 & e_3 \\ e_3 & -e_2 & -e_3 \end{bmatrix}$ | — |
| 10 | $\begin{bmatrix} e_2 \\ j \cdot e_0 \end{bmatrix}$ | $\begin{bmatrix} e_1 & e_2 \\ e_1 & -e_2 \end{bmatrix}$ | $\begin{bmatrix} e_2 & e_3 & e_3 \\ e_2 & e_3 & -e_3 \end{bmatrix}$ | — |
| 11 | $\begin{bmatrix} e_2 \\ -j \cdot e_2 \end{bmatrix}$ | $\begin{bmatrix} e_1 & e_2 \\ je_1 & -je_2 \end{bmatrix}$ | $\begin{bmatrix} e_3 & e_2 & e_2 \\ e_3 & e_2 & -e_2 \end{bmatrix}$ | — |
| 12 | $\begin{bmatrix} e_3 \\ e_3 \end{bmatrix}$ | $\begin{bmatrix} e_0 & e_3 \\ e_0 & -e_3 \end{bmatrix}$ | $\begin{bmatrix} e_3 & e_2 & e_2 \\ e_3 & e_2 & -e_2 \end{bmatrix}$ | — |
| 13 | $\begin{bmatrix} e_3 \\ -e_3 \end{bmatrix}$ | $\begin{bmatrix} e_0 & e_3 \\ je_0 & -je_3 \end{bmatrix}$ | $\begin{bmatrix} e_0 & e_3 & e_0 \\ e_0 & -e_3 & -e_0 \end{bmatrix}$ | — |
| 14 | $\begin{bmatrix} e_3 \\ j \cdot e_3 \end{bmatrix}$ | $\begin{bmatrix} e_1 & e_3 \\ e_1 & -e_3 \end{bmatrix}$ | $\begin{bmatrix} e_3 & e_0 & e_0 \\ e_3 & e_0 & -e_0 \end{bmatrix}$ | — |
| 15 | $\begin{bmatrix} e_3 \\ -j \cdot e_3 \end{bmatrix}$ | $\begin{bmatrix} e_1 & e_3 \\ je_1 & -je_3 \end{bmatrix}$ | $\begin{bmatrix} e_0 & e_3 & e_3 \\ e_0 & e_3 & -e_3 \end{bmatrix}$ | —. |

20. The base station of claim 16, wherein the first codebook is represented, if the first codebook is generated based on eight antenna ports and rank-5 to rank-8, the following:

| Codebook index | Rank-5 codebook | Rank-6 codebook |
|---|---|---|
| 0 | $\begin{bmatrix} e_0 & e_0 & e_1 & e_1 & e_2 \\ e_0 & -e_0 & e_1 & -e_1 & e_2 \end{bmatrix}$ | $\begin{bmatrix} e_0 & e_0 & e_1 & e_1 & e_2 & e_2 \\ e_0 & -e_0 & e_1 & -e_1 & e_2 & -e_2 \end{bmatrix}$ |
| 1-15 | — | — |

| Codebook Index | Rank-7 codebook | Rank-8 codebook |
|---|---|---|
| 0 | $\begin{bmatrix} e_0 & e_0 & e_1 & e_1 & e_2 & e_2 & e_3 \\ e_0 & -e_0 & e_1 & -e_1 & e_2 & -e_2 & e_3 \end{bmatrix}$ | $\begin{bmatrix} e_0 & e_0 & e_1 & e_1 & e_2 & e_2 & e_3 & e_3 \\ e_0 & -e_0 & e_1 & -e_1 & e_2 & -e_2 & e_3 & -e_3 \end{bmatrix}$ |
| 1-15 | — | —. |

* * * * *